(12) United States Patent
Kaburagi

(10) Patent No.: US 7,443,543 B2
(45) Date of Patent: Oct. 28, 2008

(54) IMAGE PROCESSING APPARATUS AND IMAGE PROCESSING METHOD

(75) Inventor: Hiroshi Kaburagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/968,209

(22) Filed: Oct. 18, 2004

(65) Prior Publication Data
US 2005/0083552 A1  Apr. 21, 2005

(30) Foreign Application Priority Data
Oct. 21, 2003 (JP) ............................. 2003-360286

(51) Int. Cl.
*H04N 1/405* (2006.01)

(52) U.S. Cl. ..................................... 358/3.15; 358/3.14

(58) Field of Classification Search ....... 358/3.14–3.15, 358/3.21–3.22, 1.9, 2.1, 3.27; 382/237
See application file for complete search history.

(56) References Cited

U.S. PATENT DOCUMENTS

| 5,018,218 A | * | 5/1991 | Peregrim et al. ............ 382/103 |
| 5,200,841 A | * | 4/1993 | Kotaki et al. ................ 358/2.99 |

FOREIGN PATENT DOCUMENTS

| JP | 10-42141 A | | 2/1998 |
| JP | 2001169099 A | * | 6/2001 |

* cited by examiner

*Primary Examiner*—Thomas D Lee
*Assistant Examiner*—Stephen M Brinich
(74) *Attorney, Agent, or Firm*—Canon U.S.A. Inc., I.P. Division

(57) ABSTRACT

A smoothing process is performed on image data to obtain improved image quality. Output image data is switched among image data subjected to smoothing, image data subjected to second bit conversion, and image data subjected to pseudo halftone representation process. In this manner, jaggies at edges can be smoothed even in multilevel image data subjected to image forming process such as screen processing. Smoothing for image data with degraded image quality due to, for example, lossy compression such as JPEG compression can also be achieved. Furthermore, degradation in image quality that occurs when a conventional smoothing process is applied to image data subjected to particular image processing can be avoided.

24 Claims, 19 Drawing Sheets

```
·······Program······· ~801 void init_rnd (unsigned char p[]) ~802
{
  int ii;

for (ii=0;ii<26; ii++) {
    p[ii]=0;
  }
  p[2]=params->rd1; p[4]=params->rd2; p[8]=params->rd3; p[16]=params->rd4;
}

/*—— Generate randomnumbers —— */
unsigned char make_rnd (unsigned char p[]) ~803
{
  int jj;
  unsigned char out;

p[0]=((p[25] ^ p[24] ^ p[23] ^ p[22])&1);
  for (jj=24; jj>=0; --jj) {  p[jj+1]=p[jj]; }
  out=p[17];

return (out);
}
```

FIG. 12

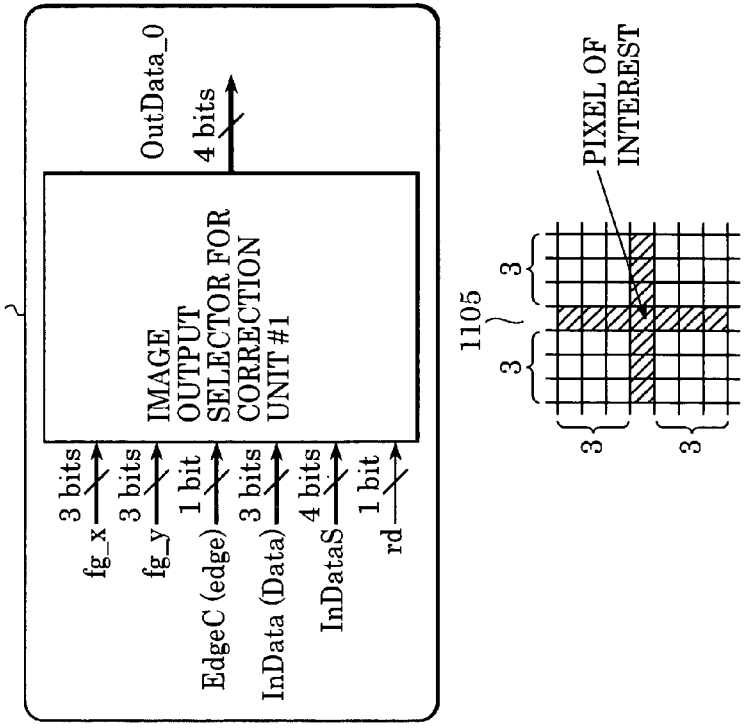

```
------- Program -------- 1101 int sum;
int ii, jj;
int tmp;
unsigned char out;

sum=0;  ---1102
         if ( ((fg_x>=(params->seriateBKx)) | | (fg_y>=(params->seriateBKy))) &&edge !=0) {
           for (ii=xx-3; ii<=xx+3; ii++) {
sum : 1      sum+=( Data[yy][ii]<<(params->mask2[0][ii-(xx-3)]) );
1bit       }
           for (jj=yy-3; jj<=yy+3; jj++) {
             sum+=( Data[jj][xx]<<(params->mask2[1][jj-(yy-3)]) );
           }
   1103    out=(LUTI[sum>>3]);   /*=>LUTI[sum<<5)>>8]*/
       } else if (edge!=0){
         /*---Only the edge part output the image data---*/
         if (Data[yy][xx]!=0){
           tmp=(Data[yy][xx])+rd;
         } else {
           tmp=0;
         }
         if (tmp>7) {tmp=7;}
   1104   out=(LUTE[temp]);
       } else { /* Carry out the through output of the screen data */
           out=InDataS[yy][xx];
       } return (out);
```

FIG. 14

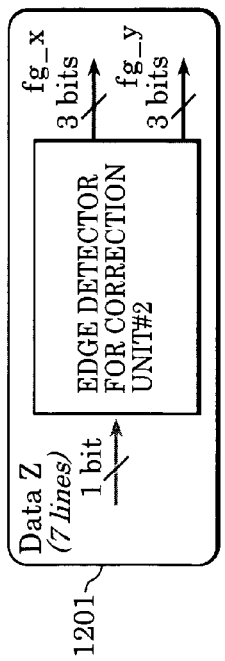

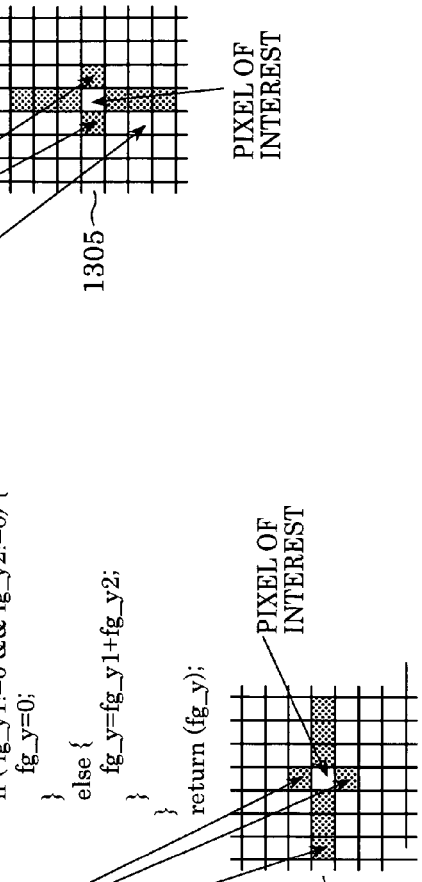

```
int ii;
unsigned char fg_x1, fg_x2;
unsigned char fg_x;

/*—remark line check—*/
fg_x=0;
fg_x1=0;
fg_x2=0;
if ((DataZ[yy-1][xx]>0) || (DataZ[yy+1][xx]>0) ) {
    for (ii=xx-3; ii<=xx;ii++) {
        if ( DataZ[yy][ii]>0 ) { /*black count1 */
            fg_x1++;
        }
    }
    for (ii=xx+1;ii<=xx+3;ii++) {
        if ( DataZ[yy][ii]>0 ) { /*black count2 */
            fg_x2++;
        }
    }
    if ( fg_x1!=0 && fg_x2!=0) {
        fg_x=0;
    }
    else {
        fg_x=fg_x1+fg_x2;
    }
}
return(fg_x);
```

```
int jj;
unsigned char fg_y1, fg_y2;
unsigned char fg_y;

/*—remark line check—*/
fg_y1=0;
fg_y2=0;
fg_y=0;
if ((DataZ[yy][xx-1]>0) || (DataZ[yy][xx+1]>0) ) {
    for (jj=xx-3; ii<yy; jj++) {
        if ( DataZ[jj][xx]>0 ) { /*Black count1 */
            fg_y1++;
        }
    }
    for (jj=yy+1; jj<=yy+3; jj++) {
        if ( DataZ[jj][xx]>0 ) { /*Black count2 */
            fg_y2++;
        }
    }
    if ( fg_y1!=0 && fg_y2!=0) {
        fg_y=0;
    }
    else {
        fg_y=fg_y1+fg_y2;
    }
}
return (fg_y);
```

FIG. 19

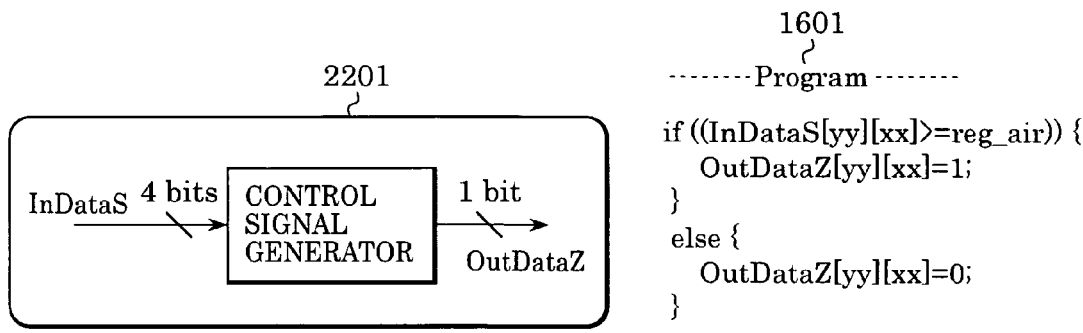

```
           1601
------- Program -------
if ((InDataS[yy][xx]>=reg_air)) {
    OutDataZ[yy][xx]=1;
}
else {
    OutDataZ[yy][xx]=0;
}
```

FIG. 20

STORAGE MEDIUM SUCH AS AN FD OR CD-ROM

| DIRECTORY INFORMATION |
|---|
| FIRST DATA PROCESSING PROGRAM<br>PROGRAM CODES CORRESPONDING TO FIG. 5 |
| SECOND DATA PROCESSING PROGRAM<br>PROGRAM CODES CORRESPONDING TO FIG. 6 |
| THIRD DATA PROCESSING PROGRAM<br>PROGRAM CODES CORRESPONDING TO FIG. 8 |
| FOURTH DATA PROCESSING PROGRAM<br>PROGRAM CODES CORRESPONDING TO FIG. 10 |
| FIFTH DATA PROCESSING PROGRAM<br>PROGRAM CODES CORRESPONDING TO FIG. 11 |
| SIXTH DATA PROCESSING PROGRAM<br>PROGRAM CODES CORRESPONDING TO FIG. 12 |
| SEVENTH DATA PROCESSING PROGRAM<br>PROGRAM CODES CORRESPONDING TO FIG. 14 |
| EIGHTH DATA PROCESSING PROGRAM<br>PROGRAM CODES CORRESPONDING TO FIG. 15 |
| NINTH DATA PROCESSING PROGRAM<br>PROGRAM CODES CORRESPONDING TO FIG. 16 |
| TENTH DATA PROCESSING PROGRAM<br>PROGRAM CODES CORRESPONDING TO FIG. 19 |
|  |

MEMORY MAP OF STORAGE MEDIUM

IMAGE PROCESSING APPARATUS AND IMAGE PROCESSING METHOD

This application claims priority from Japanese Patent Application No. 2003-360286 filed Oct. 21, 2003, which is hereby incorporated by reference herein.

BACKGROUND OF THE INVENTION

1. Field of the Invention

The present invention relates to an image processing system capable of correcting image imperfections to increase image quality.

2. Description of the Related Art

In the art of image processing system, several techniques are known to improve jaggies that occur on images printed with printers with a low resolution.

Jaggies are jagged edges around printed characters, that is, they are stairstep-like irregularities that appear at edges of characters. An example is shown in FIG. 21.

FIG. 21 is a schematic diagram showing a manner in which a character is processed by a conventional image processing system. In the example shown in FIG. 21, jaggies occur at edges of the character.

In FIG. 21, each of small blocks arranged in a matrix form corresponds to one of pixels arranged at a density of, for example, 300 dpi. In the specific example shown in FIG. 21, a Japanese syllabary character (hiragana) is displayed with a resolution of 300 dpi, and stairstep-shaped jaggies appear in curved portions.

It is known in the art to detect portions having jaggies by means of pattern matching and then adding image data to the detected portions thereby reducing jaggies. Such a process for reducing jaggies is also called a smoothing process.

Pattern matching is a well known technique and a description thereof may be found, for example, in Japanese Patent Laid-Open No. 10-42141, and thus details of the pattern matching technique are not described herein.

FIGS. 22A and 22B are schematic diagrams showing examples of characters processed by a conventional image processing system. In those examples, jaggies at edges or in other portions of characters are improved.

In the example shown in FIG. 22A, halftone data is added to pixels detected in pattern matching. More specifically, halftone data is added to pixels forming stairsteps shown in FIG. 21. In particular, in printers based on electrophotographic process, a good improvement is achieved simply by adding halftone data to portions having jaggies.

In the example shown in FIG. 22B, pixels in particular areas detected by pattern matching are each divided into sub-pixels, and data is added at sub-pixel positions.

Dividing of pixels is performed such that the pixels are divided into sub-pixels, and dots are formed at some sub-pixel positions. In the example shown in FIG. 22B, each pixel is divided into two sub-pixels. A subdivision technique is also disclosed in Japanese Patent Laid-Open No. 10-42141, and thus details thereof are not described herein.

In the smoothing process described above, half dots or sub-dots are added to portions having jaggies. Conversely, some full dots may be converted into half dots or some full dots may be divided into sub-pixels so as to reduce the pixel size in portions having jaggies.

A technique of easing the above problem in the image processing system is disclosed in Japanese Patent Laid-Open No. 10-42141 ('141 patent).

However, generally, conventional systems have various disadvantages as described below with reference to FIGS. 23A and 23B.

FIGS. 23A and 23B are schematic diagrams showing examples of characters processed by the conventional image processing system. In those examples, stairstep-shaped jaggies at edges or in other portions of characters are improved.

If a halftone character shown in FIG. 23A is subjected to an image forming process such as screen processing, the character line can become discontinuous as shown in FIG. 23B.

This occurs when halftone characters are represented with a screen resolution lower than a printer resolution such as 300 dpi.

In this case, smoothing based on pattern matching cannot remove the jaggies.

The screen resolution cannot be greater than the printer resolution, because the screen resolution is represented in a pseudo fashion by combining a plurality of pixels (dots) of a printer into a single pixel. For example, the screen resolution (number of lines) generally ranges from 133 to 175 lines. Even in a very special case, the resolution is limited to 268 lines. The screen resolution is limited to the above described range because higher screen resolutions do not lead to high quality in images formed by electrophotographic printers.

To give a better understanding of the structure of jaggies, FIG. 24 shows a macroscopic view of a part of the character shown in FIG. 23B.

In FIG. 24, character processing by a conventional image processing system is schematically shown. In the example shown in FIG. 24, jaggies appear at edges of the character.

Jaggies discussed herein appear at edges when image data is subjected to screen processing.

In addition to jaggies that appear at edges due to the above-described printer resolution, improvement of jaggies that appear due to low resolutions in screen processing will also be discussed herein.

When an image compressed by means of lossy compression such as JPEG compression is subjected to smoothing process, mosquito noise (that occurs in an image with high-frequency components or occurs at edges of an image when the data size is compressed by a large factor by means of lossy compression) can occur due to degradation caused by the compression. The mosquito noise can prevent the matching process from detecting a jagged edge. If such a failure occurs in the matching process, good smoothing cannot be achieved.

Although the '141 patent attempts to address some of the above disadvantages, it has been found that many conventional image processing systems are unable to provide suitable smoothing for both multilevel images and for images based on processes other than error diffusion process.

SUMMARY OF THE INVENTION

In an aspect, the present invention provides an image processing system comprising an input unit for inputting N-bit multilevel image data, a pseudo halftone representation unit for converting the N-bit image data into M-bit image data, a first bit conversion unit for converting the N-bit image data into L-bit image data, a control signal generation unit for generating a control signal from the L-bit image data, a first edge detection unit for detecting a first edge from the control signal generated by the control signal generation unit, a second edge detection unit for detecting a second edge different from the first edge from the control signal generated by the control signal generation unit, a second bit conversion unit for converting the L-bit image data into M-bit image data, a smoothing unit for smoothing the L-bit image data and generating M-bit image data as a result of the smoothing, and an output image data switching unit for switching output image data among the image data output by the smoothing unit, the image data output by the second bit conversion unit, and the image data output by the pseudo halftone representation unit, depending on the first and second edges detected by the first and second edge detection units. It should be observed that N>M and N>L.

In another aspect, the present invention provides an image processing system comprising an input unit for inputting N-bit multilevel image data, a pseudo halftone representation unit for converting the N-bit image data into M-bit (N>M) image data, a first bit conversion unit for converting the N-bit image data into L-bit (N>L) image data, a control signal generation unit for generating a control signal from the M-bit image data, a first edge detection unit for detecting a first edge from the control signal generated by the control signal generation unit, a second edge detection unit for detecting a second edge from the control signal generated by the control signal generation unit, a second bit conversion unit for converting the L-bit image data into M-bit image data, a smoothing unit for smoothing the L-bit image data and generating M-bit image data as a result of the smoothing, and an output image data switching unit for switching output image data among the image data output by the smoothing unit, the image data output by the second bit conversion unit, and the image data output by the pseudo halftone representation unit, depending on the first and second edges detected by the first and second edge detection units.

In another aspect, the present invention provides an image processing method comprising an input step of inputting N-bit multilevel image data, a pseudo halftone representation step of converting the N-bit image data into M-bit (N>M) image data, a first bit conversion step of for converting the N-bit image data into L-bit (N>L) image data, a control signal generation step of generating a control signal from the L-bit image data, a first edge detection step of detecting a first edge from the control signal generated in the control signal generation step, a second edge detection step of detecting a second edge different from the first edge from the control signal generated in the control signal generation step, a second bit conversion step of converting the L-bit image data into M-bit image data, a smoothing step of smoothing the L-bit image data and generating M-bit image data as a result of the smoothing, and an output image data switching step of switching output image data among the image data output in the smoothing step, the image data output in the second bit conversion step, and the image data output in the pseudo halftone representation step, depending on the first and second edges detected in the first and second edge detection steps.

In another aspect, the present invention provides an image processing method comprising an input step of inputting N-bit multilevel image data, a pseudo halftone representation step of converting the N-bit image data into M-bit (N>M) image data, a first bit conversion step of for converting the N-bit image data into L-bit (N>L) image data, a control signal generation step of generating a control signal from the M-bit image data, a first edge detection step of detecting a first edge from the control signal generated in the control signal generation step, a second edge detection step of detecting a second edge from the control signal generated in the control signal generation step, a second bit conversion step of converting the L-bit image data into M-bit image data, a smoothing step of smoothing the L-bit image data and generating M-bit image data as a result of the smoothing, and an output image data switching step of switching output image data among the image data output in the smoothing step, the image data output in the second bit conversion step, and the image data output in the pseudo halftone representation step, depending on the first and second edges detected in the first and second edge detection steps.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram showing a program described in C language for implementing the output image switching unit in the first correction unit of FIG. 9.

FIG. 14 is a diagram showing a program described in C language for implementing the edge detection unit in a second correction unit shown in FIG. 13.

FIG. 19 is a diagram showing an example of a program described in the C language for implementing the control signal generator of FIG. 18.

FIG. 20 is a diagram showing a memory map of a storage medium that stores various data processing programs readable by the image processing system according to the present invention.

DETAILED DESCRIPTION OF THE EMBODIMENTS

The present invention is described in further detail below with reference to embodiments in conjunction with the drawings.

Figure 1:
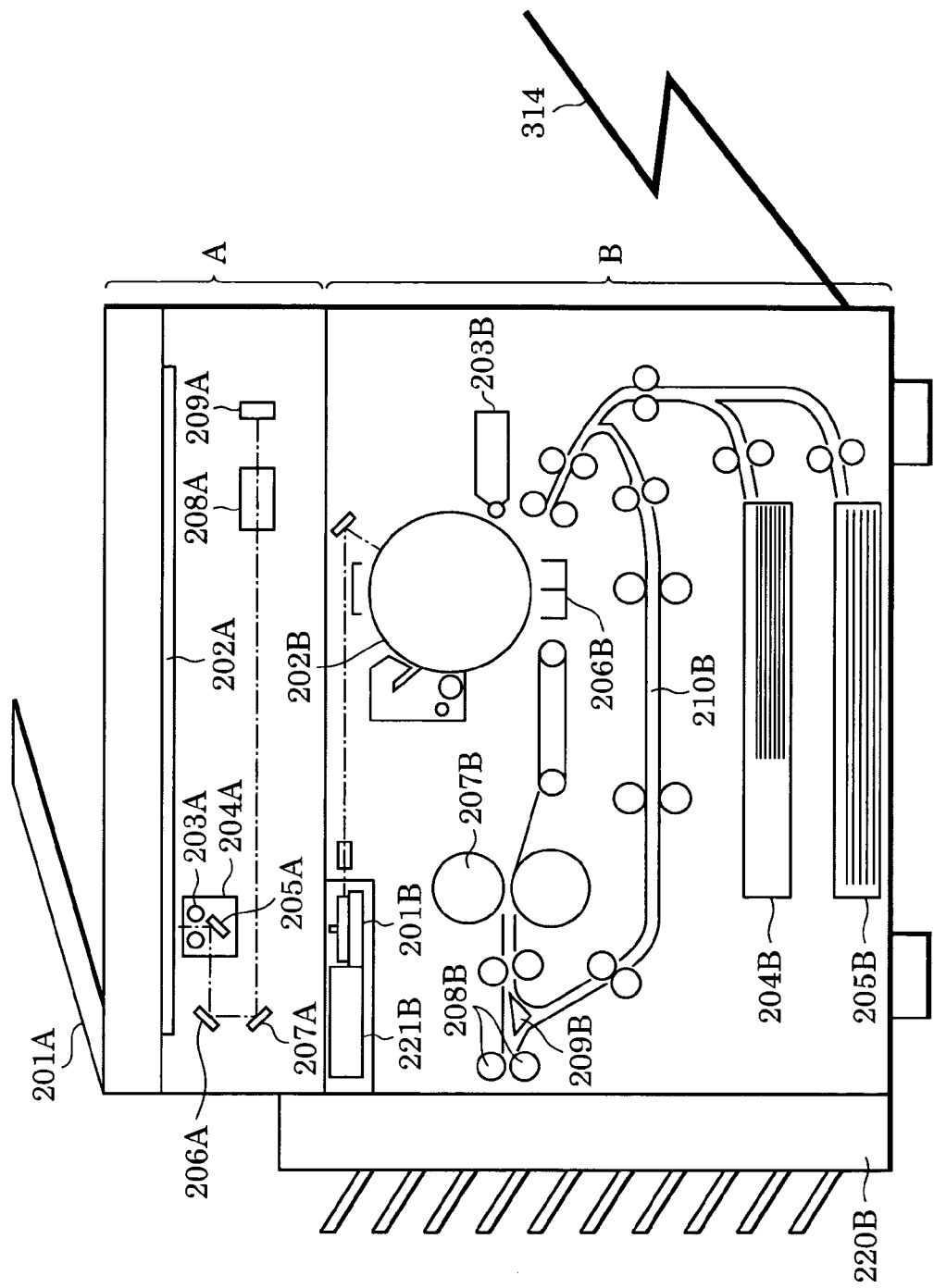
FIG. 1 is a cross-sectional view of a multi-function machine using an image processing system according to an embodiment of the present invention.

FIG. 1 is a cross-sectional view schematically showing a multifunction peripheral system using an image processing system according to the present invention. This multifunction peripheral system includes, as mechanical parts, a color scanner A and a printer B.

In a color scanner unit A shown in FIG. 1, a document feeder 201A feeds documents one by one from a last page onto platen glass 202A. After scanning is completed, the document feeder 201A removes the document from the platen glass 202A. When a document is put on the platen glass 202A, a lamp 203A is lit, and a scanner unit 204A on which the lamp 203A is disposed is moved so as to expose the document with light while scanning the document. During the scanning operation, reflected light from the document is directed to a CCD color image sensor (hereinafter, referred to simply as "CCD") 209A via mirrors 205A, 206A and 207A and a lens 208A.

The reflected light incident on the CCD 209A is separated into three color components R, G, and B, and the respective color components are converted into electrical signals indicating intensity of the respective color components. The image data including three color components output from the CCD 209A is converted into digital image data from analog form and input to an image processing unit (304 (FIG. 2)). In the image processing unit 304, image processing including shading correction, gray level correction, quantization (into N-level signal), and smoothing is performed, and the resultant image data is supplied to the printer B (305).

In the printer B shown in FIG. 1, a laser driver 221B drives a laser emitting device 201B such that laser light corresponding to each color component of the image data output from the image processing unit 304 (FIG. 2) is emitted from the laser emitting device 201B. The laser light strikes a photosensitive drum 202B, and thus a latent image corresponding to the laser light is formed on the photosensitive drum 202B.

Figure 2:
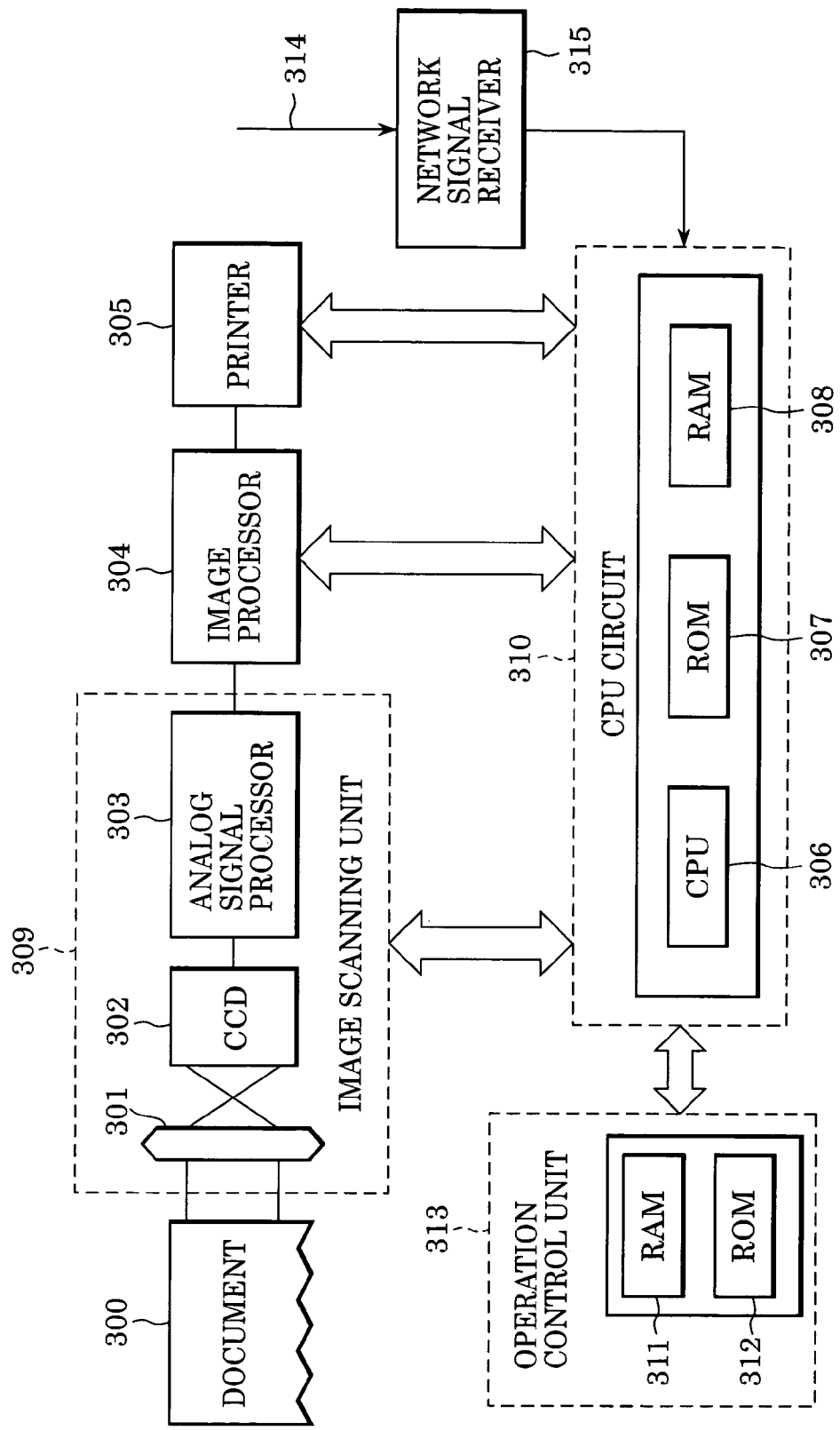
FIG. 2 is a block diagram showing data processing performed in the image processing system of FIG. 1.

Toner serving as developing powder is applied to the part of the latent image on the photosensitive drum 202B by a development unit 203B. Although only one developing unit is shown in FIG. 2 for the purpose of simplification, there are actually four developing units corresponding to respective colors of C, M, Y, and K, and toner is provided for each of those four colors. Alternatively, four sets of components each including a photosensitive drum and a developing unit may be used.

In synchronization with the start of illumination of laser light, recording paper is fed from selected one of cassettes 204B and 205B and transported to a transfer unit 206B.

Thus, the developing powder is transferred from the photosensitive drum 202B to the recording paper. After the developing powder is transferred to the recording paper, the recording paper is transported to a fuser unit 207B and the developing powder is fused to the recording paper by heat and pressure provided by the fuser unit 207B. After the recording paper passes through the fuser unit 207B, it is transported by an output roller 208B to a sorter 220B. The sorter 220B sorts the received paper into particular bins.

When sorting is not necessary, the sorter 220B puts the received paper on a bin at the top. When two-sided printing is specified, after the recording paper is transported to the output roller 208B, the output roller 208B is rotated in an opposite direction to transport the recording paper to a paper re-feeding path. A flapper 209B serves as a guide that allows the paper to be correctly directed to the paper re-feeding path. When multiple printing is specified, the recording paper is guided by the flapper 209B so as to be directly transported to the paper re-feeding path 210B without being transported to the output roller 208B. The recording paper transported to the paper re-feeding path is fed again to the transfer unit 206B in synchronization with the start of illumination of laser light.

As is well known, forming a latent image, developing the latent image into a visible image, and fusing the visible image for each color can be accomplished by performing the above sequence four times using the paper transport mechanism described above.

In FIG. 1, reference numeral 314 denotes a network cable. Typically, a network system called Ethernet® is used to transmit/receive information among various units connected via physical cables such as 10Base-T or 10Base5 cables using a protocol such as TCP/IP. Note that the network is not limited to that using a network cable, but a wireless network system may also be used.

A PDL signal or a bitmap image signal may be received via the network cable 314, and an image may be output by the printer in accordance with the received signal.

FIG. 2 is a block diagram showing data processing performed in the image processing system of FIG. 1, wherein similar parts to those in FIG. 1 are denoted by similar reference numerals.

In FIG. 2, an image scanning unit 309 includes a lens 301, a CCD sensor 302, and an analog signal processor 303. When a document image 300 is formed on the CCD sensor 302 via the lens 301, the CCD sensor 302 converts the document image 300 into an analog signal. The resultant image information is input to the analog signal processor 303. In the analog signal processor 303, the image signal is subjected to a sample-and-hold process, a dark level correction, and analog-to-digital conversion.

Figure 3:
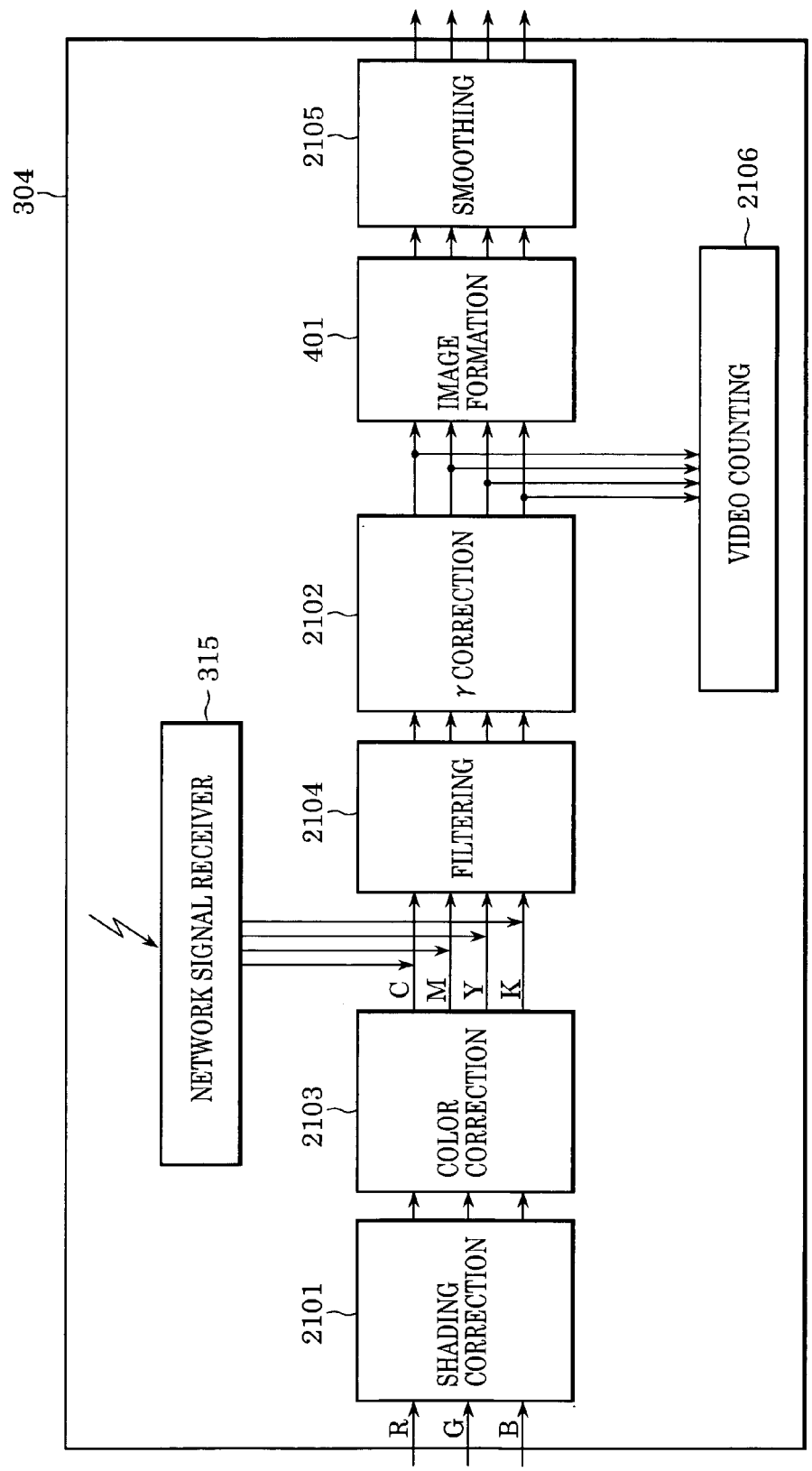
FIG. 3 is a block diagram showing an exemplary structure of the image processor of FIG. 2.

The resultant digital signal is supplied to the image processing unit 304 shown in FIG. 3. In the image processing unit 304, the digital signal is subjected to shading correction 2101, color correction 2103, filtering 2104, y correction 2102, video counting 2106, image forming 401, and smoothing 2105. Thereafter, the resultant digital signal is output to the printer 305. The image forming process 401 refers to a conversion of input N-bit image data into M-bit image data. In the present embodiment, N and M are set to 8 and 4, respectively. The conversion may be performed by means of screen processing (dithering) or error diffusion. The conversion technique is well known in the art, and thus details thereof are not described herein. The video counting process 2106 refers to a process of measuring the consumption of toner. More specifically, the amount of toner to be consumed is calculated from the signal value output to the printer.

The remaining amount of toner is calculated and displayed on an operation control unit 313 thereby informing users of the remaining amount of toner. This technique is also known, and thus details thereof are not described herein.

FIG. 3 is a block diagram showing an exemplary structure of the image processing unit 304 shown in FIG. 2, wherein similar parts to those in FIG. 2 are denoted by similar reference numerals.

In FIG. 3, signals output from a network signal receiver 315 are connected to the outputs of the color correction unit 2103, because data received via a network is assumed to be CMYK intensity data. When data received via the network is RGB intensity data, signals output from the network signal receiver 315 are connected to the inputs of the color correction unit 2103. Although the signals received via the network are supplied directly to the image processing unit 304 in FIG. 3 for the purpose of simplicity of illustration, the signals are actually supplied via a CPU circuit 310.

The printer 305 shown in FIG. 2 includes an exposing unit (not shown) including a laser, an image forming unit (not shown), a paper feeding unit (not shown), and other parts. The printer 305 forms an image on recording paper in accordance with an input image signal.

The CPU circuit 310 includes a CPU 306, a ROM 307, a RAM 308, etc., and the CPU circuit 310 controls sequential processing performed by the present system by controlling the operation of various parts such as the image scanning unit 309, the image processing unit 304, the printer 305, and the operation control unit 313.

The operation control unit 313 includes a RAM 311 and a ROM 312. Various kinds of text information are displayed on a user interface of the operation control unit 313, and Information input by a user is displayed and/or stored.

Information input by a user via the operation control unit 313 is sent to the image scanning unit 309, the image processing unit 304, or the printer 305, via the CPU circuit 310.

The present invention is characterized by the image processing unit 304 in which the smoothing process is performed by the smoothing unit 2105 as follows.

Figure 4:
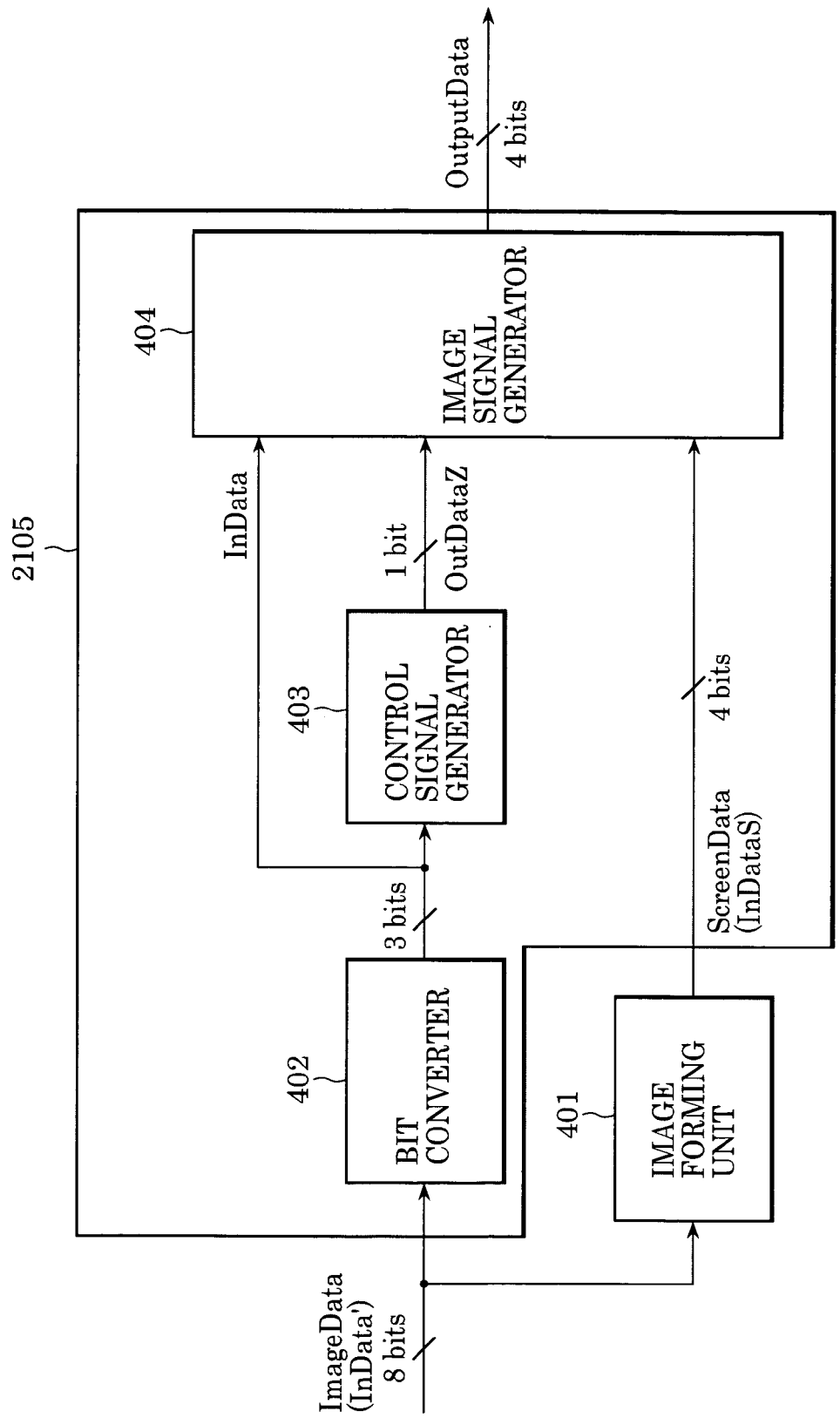
FIG. 4 is a block diagram showing an exemplary structure of the smoothing unit of FIG. 3.

FIG. 4 is a block diagram showing an exemplary structure of the smoothing unit 2105 shown in FIG. 3.

Although only processing for one color (ImageData) is shown in FIG. 4, there are actually four sets similar to that shown in FIG. 4. That is, processing is performed separately for each of CMYK colors, and FIG. 4 shows processing performed for only one of the CMYK colors.

First, the process performed by the smoothing unit 2105 is described.

When N-bit multilevel image data is input, the input N-bit data is supplied to a bit converter 402 and an image forming unit 401 and converted into an L-bit signal and an M-bit signal, respectively. Furthermore, a 1-bit signal is generated from the L-bit signal. The signals are input to image signal correction units 705 and 706 in an image signal generator 404. The details of the image signal correction units 705 and 706 will be described with reference to FIG. 9 or 16. The image signal correction units 705 and 706 outputs M-bit data to a selector 707. The image signal correction units 705 and 706 perform processing similar to the smoothing process, but the processing is performed differently depending on whether data associated with a pixel of interest is present.

Specific processes according to the present invention are described below with reference to FIG. 4.

8-bit image data (ImageData) is input, as the N-bit image data described above, to the smoothing unit 2105. Note that this 8-bit image data has been subjected to the color correction, shading correction, and other processes described above. Next, in the bit converter 402, the input 8-bit image data is converted into 3-bit data, and the resultant data is output as the L-bit signal described above. The details of the bit conversion process are described below with reference to FIG. 5.

Figure 5:
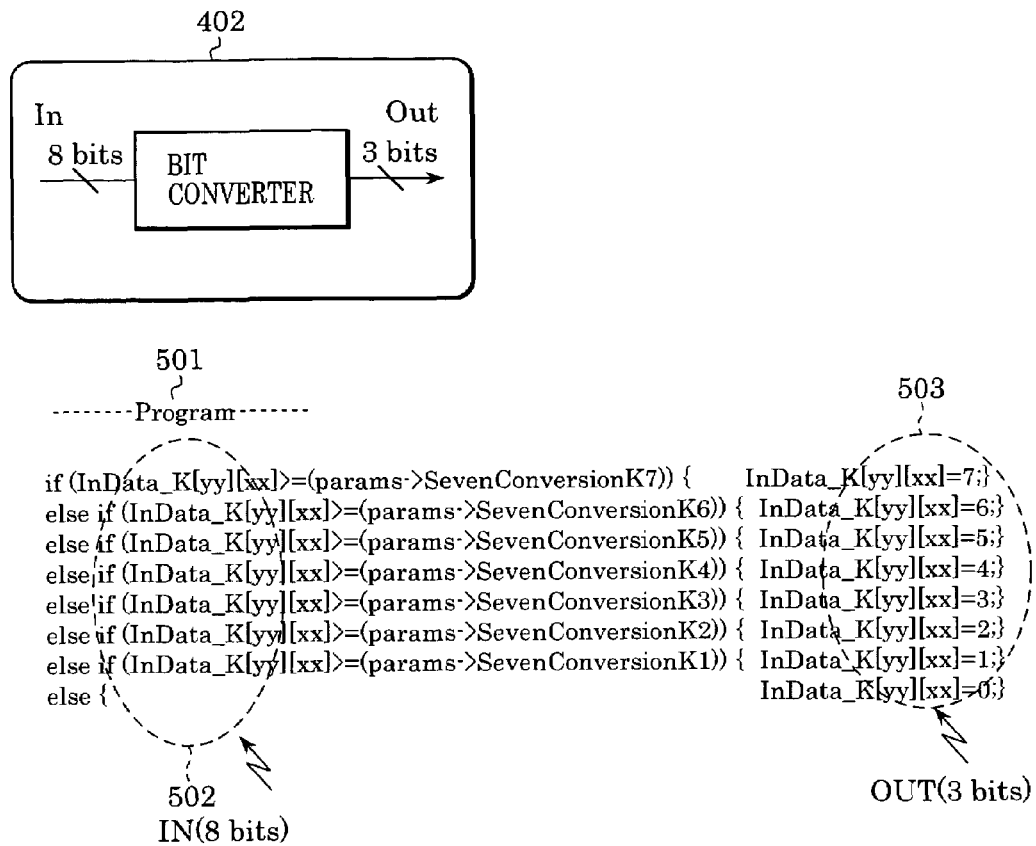
FIG. 5 is a diagram showing a program for implementing the bit converter of FIG. 4.

FIG. 5 is a diagram showing an example of a program described in C language for implementing the bit converter 402 shown in FIG. 4, wherein similar parts to those in FIG. 4 are denoted by similar reference numerals.

In FIG. 5, InData_K[yy][xx] (within dashed ellipse 502) denotes input 8-bit data, and InData_K[yy][xx]=n (within dashed ellipse 503) denotes output 3-bit data, where n is an integer in the range from 0 to 7. In the program 501, params->" denotes a parameter. In this specific example, seven parameters "params->SevenConversionK7" to "params->SevenConversionK1" are used.

More specifically, values 224, 192, 160, 128, 96, 64, and 32 represented in 8 bits are respectively set in the seven parameters described above. The input 8-bit data is compared with respective values of the parameters in "if statements", and a 3-bit signal is output as a result.

The 3-bit signal output as the result of the above process is supplied from the bit converter 402 to a control signal generator 403 and an image signal generator 404.

The details of the control signal generator 403 shown in FIG. 4 are described below. The control signal generator 403 generates an image control signal indicating a portion of image data that should be subjected to smoothing. This image control signal is represented in 1 bit and it is generated via a process implemented by a program 601 described in C language as shown in FIG. 6.

Figure 6:
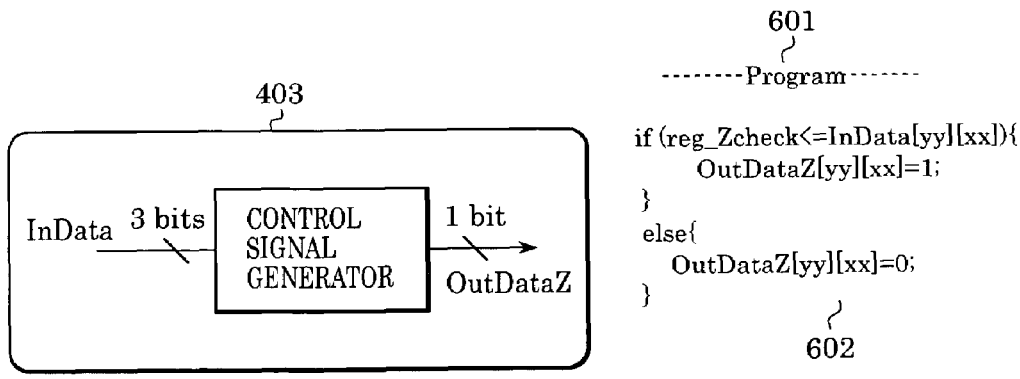
FIG. 6 is a diagram showing a program for implementing the control signal generator of FIG. 4.

FIG. 6 is a diagram showing an example of the program described in C language for implementing the control signal generator 403 shown in FIG. 4, wherein similar parts to those in FIG. 4 are denoted by similar reference numerals.

More specifically, in "if state" 602 in FIG. 6, an output "OutDataZ" becomes "1" when the input data "InData" at a particular position (pixel) is greater than a parameter "reg_Zcheck", but otherwise the output "OutDataZ" becomes "0". By properly selecting the value of the parameter "reg_Zcheck", the threshold of the intensity (brightness) that determines whether the input data should be subjected to smoothing can be adjusted.

The detailed structure of the image signal generator 404 shown in FIG. 4 and the function thereof are described below with reference to FIG. 7.

Figure 7:
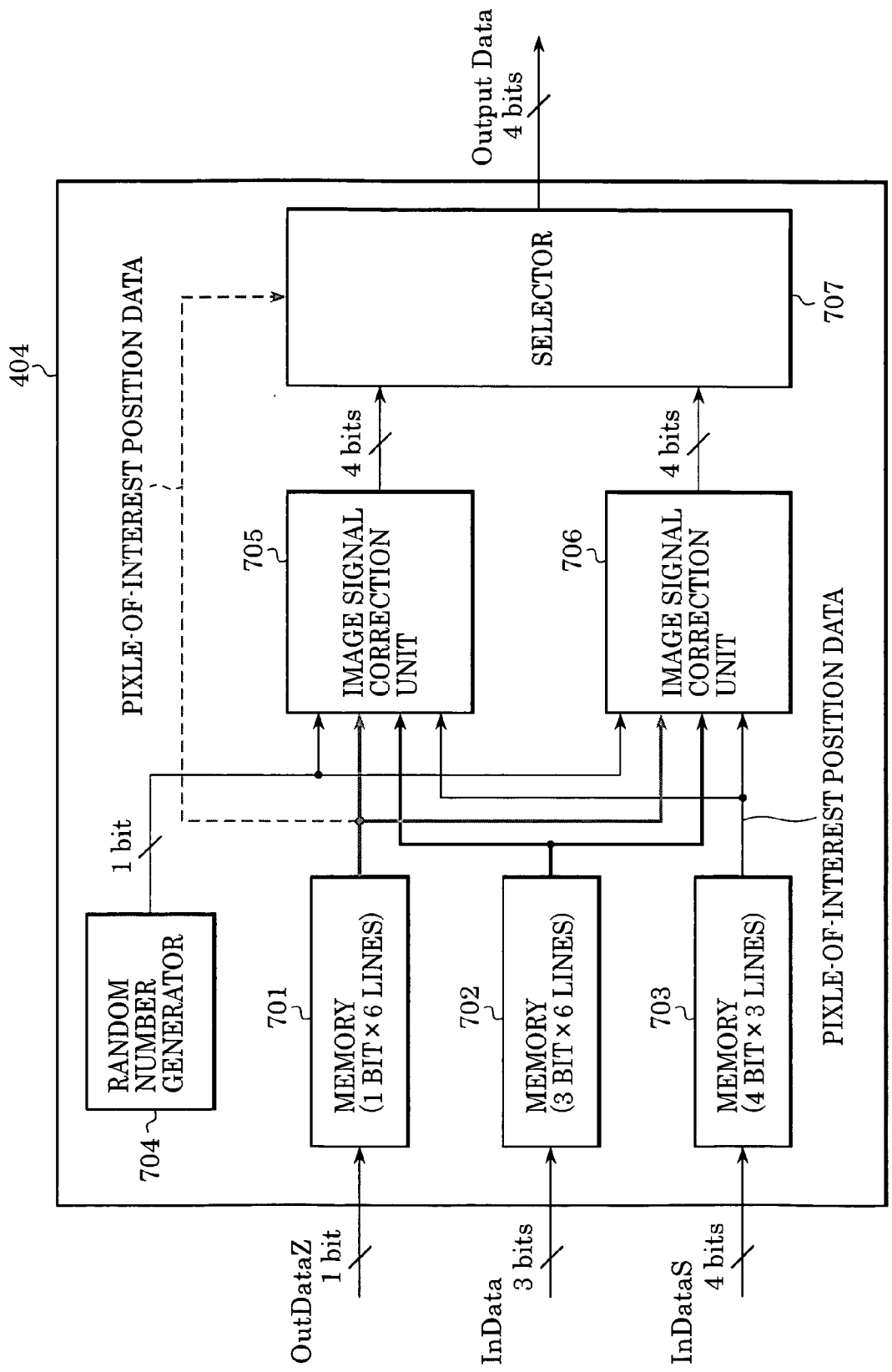
FIG. 7 is a block diagram showing an exemplary detailed structure of the image signal generator of FIG. 4.

FIG. 7 is a diagram showing functional blocks of the image signal generator 404 shown in FIG. 4, wherein similar parts to those in FIG. 4 are denoted by similar reference numerals.

In FIG. 7, signals input to the image signal generator 404 include the 1-bit signal OutDataZ indicating the image area to be subjected to smoothing, the L-bit (3-bit in this specific example) image signal InData, and the M-bit (4-bit in this specific example) image signal InDataS already subjected to image forming process.

Those signals are stored in corresponding FIFO memories each having several lines, in preparation for area processing (described below). Specific numbers of respective FIFO memories are as follows. The FIFO memory 701 has 6 lines, the FIFO memory 702 has 6 lines, and the FIFO memory 703 has 3 lines. After area processing is performed, a 4-bit signal OutputData is output as a result of the process. The details of the process will now be described.

First, the details of a random number generator 704 are described with reference to a program 801 described in C language shown in FIG. 8.

Figure 8:
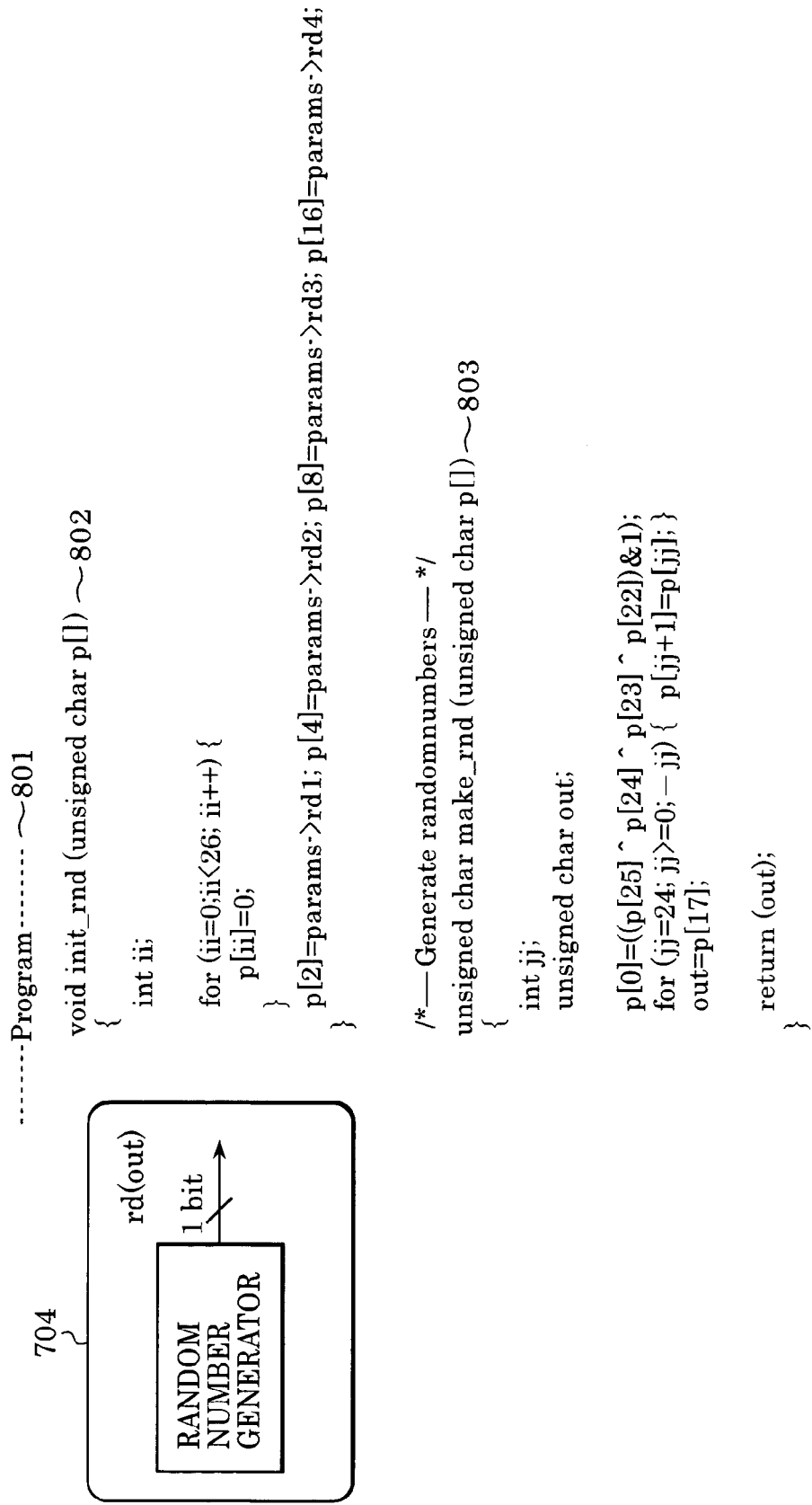
FIG. 8 is a diagram showing a program for implementing the random number generator of FIG. 7.

FIG. 8 is a diagram showing an example of the program described in the C language for implementing the random number generator 704 shown in FIG. 7, wherein similar parts to those in FIG. 7 are denoted by similar reference numerals.

In FIG. 8, 802 and 803 denote functions. The function 802 is executed once to perform initialization at the beginning of the process. In contrast, the function 803 is performed repeatedly for each pixel.

First, initialization is performed. In execution of the function 802 during initialization, 26 registers p[ii] (ii=0, 1, ..., 25) are first reset to 0, and then a 1-bit parameter is set in p[2], p[4], p[8], and p[16] such that p[2]=params->rd1, p[4]=params->rd2, p[8]=params->rd3, and p[16]=params->rd4.

For each pixel, a random number rd(out) is generated by repeatedly executing the function 803.

More specifically, the function 803 is executed as follows. First, the exclusive OR (XOR) is calculated as p[0]=((p[25]^p[24]^p[23]^p[22]) & 1), and the result is substituted into p[0]. Thereafter, using the "for statement", each data is shifted. Finally, a 1-bit signal p[17] is output as a random number.

The 1-bit random number determined in the above-described manner is supplied to both the image signal correction unit 705 and the image signal correction unit 706 shown in FIG. 7.

The details of the image signal correction unit 705 are described with reference to FIG. 9.

Figure 9:
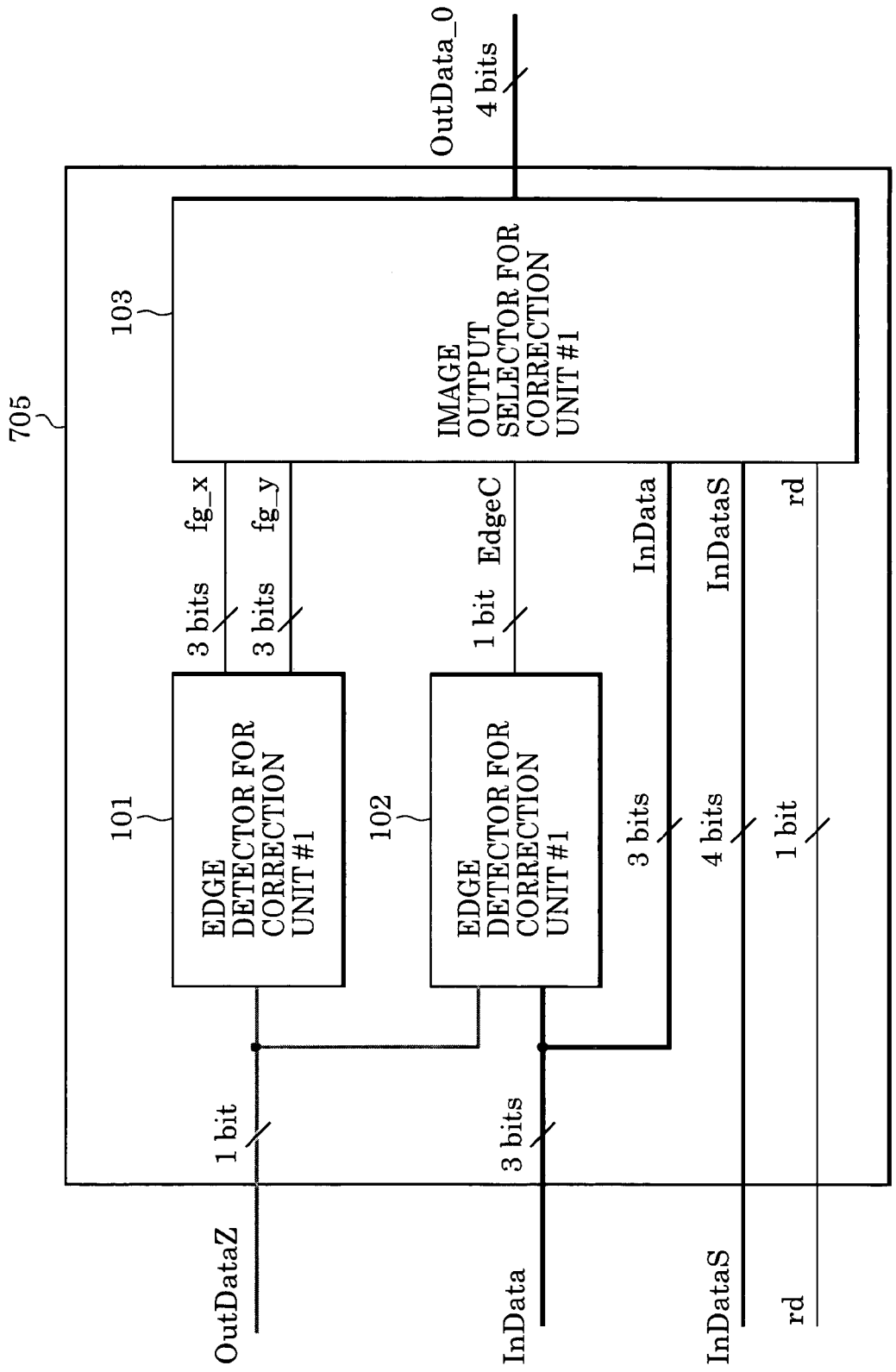
FIG. 9 is a block diagram showing an exemplary detailed structure of the image signal correction unit of FIG. 7.

FIG. 9 is a block diagram showing an exemplary structure of the image signal correction unit 705 shown in FIG. 7, wherein similar parts to those in FIG. 7 are denoted by similar reference numerals.

As shown in FIG. 7, OutDataZ", "InData", "InDataS", and "rd" are input to the image signal correction unit 705, and a 4-bit signal "OUTData_0" is output as a correction signal.

The components used by the image signal correction unit 705 to perform the process includes a first edge detection unit 102 in a first correction unit, a second edge detection unit 101 in the first correction unit, and an output image switching unit 103 in the first correction unit.

Figure 10:
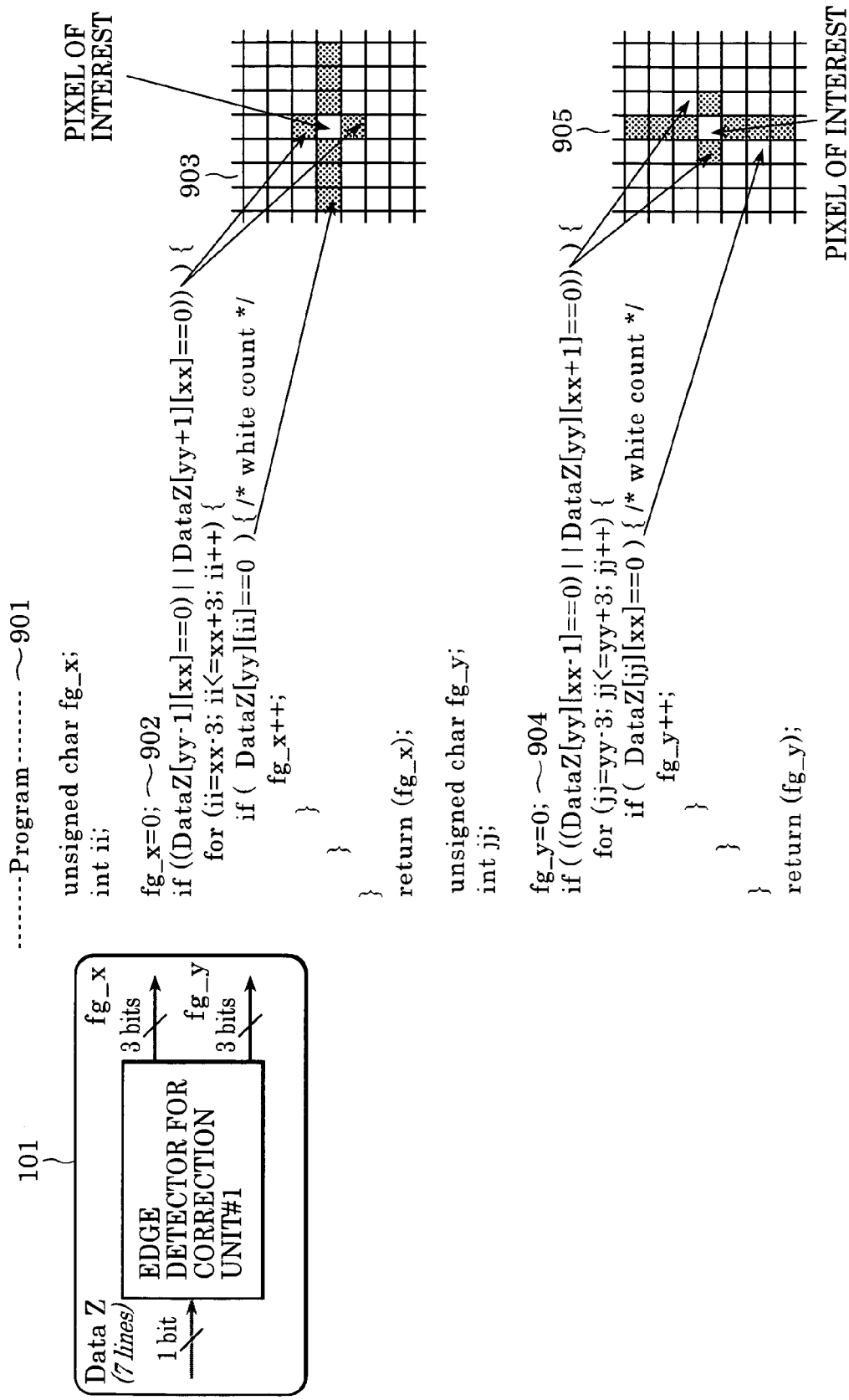
FIG. 10 is a diagram showing a program for implementing the second edge detector in the first correction unit of FIG. 9.

FIG. 10 is a diagram showing an example of a program for implementing the second edge detection unit 101 in the first correction unit shown in FIG. 9, wherein similar parts to those in FIG. 9 are denoted by similar reference numerals.

As shown in FIG. 10, the process performed by the second edge detection unit 101 in the first correction unit mainly includes two routines namely a counting process 902 and a counting process 904.

During the counting process 902, dots of 0 in the horizontal direction (x direction) are counted. In FIG. 10, an illustration 903 shows an example of a manner in which dots are counted.

In the counting process 904, dots of 0 in the vertical direction (y direction) are counted. In FIG. 10, an illustration 905 shows an example of a manner in which dots are counted.

In both counting processes 902 and 904, edges are detected on the basis of the 1-bit image-area signal. Note that edges in the horizontal or vertical direction are detected by counting dots without using a filtering process such as a Laplacian filtering process.

The results obtained via the counting process 902 and the counting process 904 described above are output as 3-bit count values fg_x and fg_y.

The edge detection unit 102 will now be described.

Figure 11:
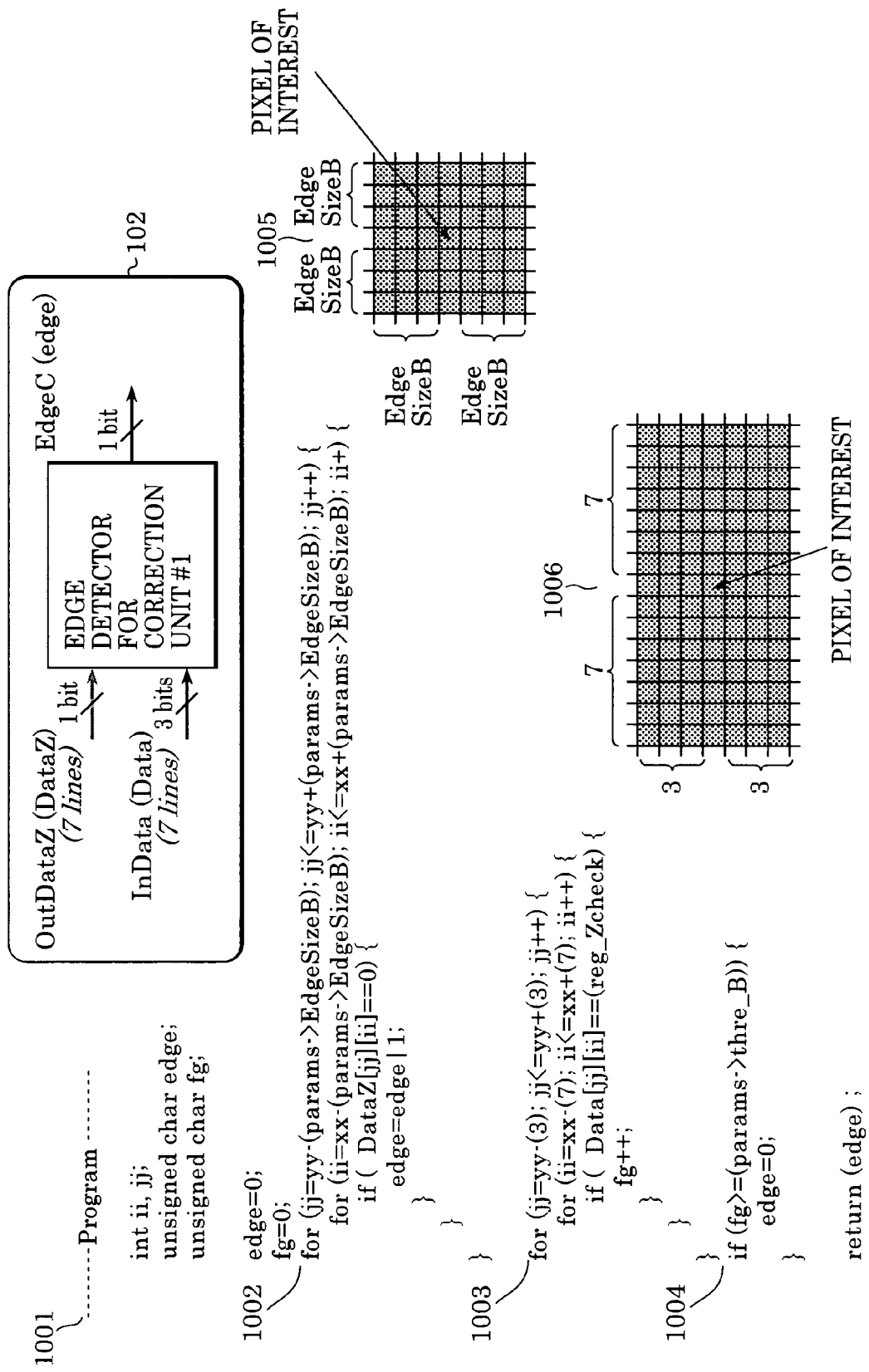
FIG. 11 is a diagram showing a program for implementing the first edge detector in the first correction unit of FIG. 9.

FIG. 11 is a diagram showing an example of a program described in C language for implementing the first edge detection unit 102 in the first correction unit shown in FIG. 9, wherein similar parts to those in FIG. 9 are denoted by similar reference numerals. The process performed by the first edge detection unit 102 includes three parts, as described below.

First, in the program 1002, as in the detection process 1005, it is determined whether an area indicated by the parameter "EdgeSizeB" includes an image-area signal having a value of 0, and an edge signal indicating the result is output.

Then in the program 1003, as in the counting process 1006, counting is performed to detect the number of pixels with the same value as the parameter "reg_Zcheck" in a 15×7 pixel area, and a signal fg indicating the result is output.

Finally, if the count value indicated by fg is equal to or greater than the parameter "thre_B", the edge signal is set to "0", but otherwise the edge signal is directly output.

One advantage of this process is that edges are detected without using a filter such as a Laplacian filter and the edge information is cleared when the count value fg, indicating the number of pixels having the same value in an area of interest as the parameter "reg_Zcheck", is equal to or greater than "thre_B".

This avoids the drawback wherein smoothing is performed for an area that needs no smoothing. That is, when the intensity of input image data varies gradually as in the case with a gradated area, if the control signal generator 403 detects an intensity level that is the same as the value set in the parameter "reg_Zcheck", the control signal generator 403 incorrectly generates the image-area signal "OutDataZ" in an area which should not be subjected to the smoothing process.

This causes an area, which needs no smoothing correction to be incorrectly subjected to smoothing process. An advantage of the present invention is that areas that require no smoothing are not subjected to the smoothing process.

By using the process described above, a 1-bit edge signal is generated and output as "EdgeC".

The output image switching unit 103 used by the first correction unit is now described.

FIG. 12 is a diagram showing an example of a program described in C language for implementing the output image switching unit 103 in the first correction unit shown in FIG. 9, wherein similar parts to those in FIG. 9 are denoted by similar reference numerals.

As shown in FIG. 12, "fg_x", "fg_y", "EdgeC", "InData", and "rd" are input to the output image switching unit 103, and 4-bit data "OUTDATA_0" obtained via a process described below is output.

The process performed by the output image switching unit 103 is performed by portions or subroutines of program 1101 namely 1102, 1103, and 1104. The details of each part are described below.

First, in the program 1102, it is determined whether the following condition is satisfied.

$$((fg\_x >= (\text{params->seriate}BKx)) || (fg\_y >= (\text{params->seriate}BKy))) \,\&\&\, \text{edge} \,!= 0 \qquad (1)$$

where params->seriateBKx and params->seriateBKy are 3-bit parameters.

That is, it is determined whether fg_x or fg_y of a pixel of interest is equal to or greater than the parameters. If fg_x or fg_y is equal to or greater than the parameters, it is further determined whether "edge" has a value other than "0". Herein, "edge" is equivalent to EdgeC.

If "edge" has a value other than 0, this indicates that an area of interest includes data having a value of 0, as described above with reference to FIG. 11.

That is, when data with a value other than "0" is present at a pixel of interest, the comparison statement (1) determines that the pixel of interest is in an edge area including a greater number of data with a value of "0" than the threshold value at continuous pixel positions in the horizontal/vertical direction.

In other words, it is indicated that an edge exists other than the vertical or horizontal edges. When such an edge is detected, the following processing is performed over an area indicated by 1105.

The sum of products of parameters "params->mask2" and input data "InData(Data)" is calculated. Smoothing is achieved by calculating the sum of products thereby producing halftone data output at edge portions having jaggies.

The halftone data generated herein is converted into final 4-bit data using a table (stored in a memory) such as an LUT1. The conversion using the table is performed by the output image switching unit 103 shown in FIG. 12 serving as the second bit converter.

When the "if statement" (1) is not satisfied, but if the following condition is satisfied, $$\text{edge} \mathrel{!=} 0 \qquad (2)$$

then a process is executed by the program 1103. That is, if a horizontal/vertical edge is detected by (2), the process described in the program 1103 is performed for the detected edge.

More specifically, if a pixel of interest has data with a value other than 0, a 1-bit random number is added to the data at the pixel of interest (that is, addition "Data[yy][xx]+rd" is performed) but otherwise "0" is output.

The Data (InData) has been converted into a 3-bit value by the bit converter 402, and thus it is necessary to re-convert the 3-bit data into 4-bit data using a table such as LUTE. This conversion process is performed by the output image switching unit 103 shown in FIG. 12 serving as the second bit conversion unit.

Note that the addition of the random number rd is not necessarily needed, and the addition may not be performed (that is, 0 may be added).

When both conditions (1) and (2) are not satisfied, a process is performed by the program 1104.

For data in non-edge portions, input data InDataS is directly output. In other words, data supplied from the image forming unit 401 is directly output.

Another feature of the process according to the present invention is that the data output by the edge detection unit is different from the data output from the image forming unit 401. In this manner, edges including those for images subjected to image forming process such as screen processing can be smoothed. Also for images with degraded image quality caused by compression (e.g., JPEG compression), edges can smoothed by converting the original data, before it is subjected to the image forming process, into the 3-bit data and further into the 1-bit control signal and performing the smoothing process on the basis of the resultant 1-bit control signal.

The image signal correction unit 706 shown in FIG. 7 is described below with reference to FIG. 13.

Figure 13:
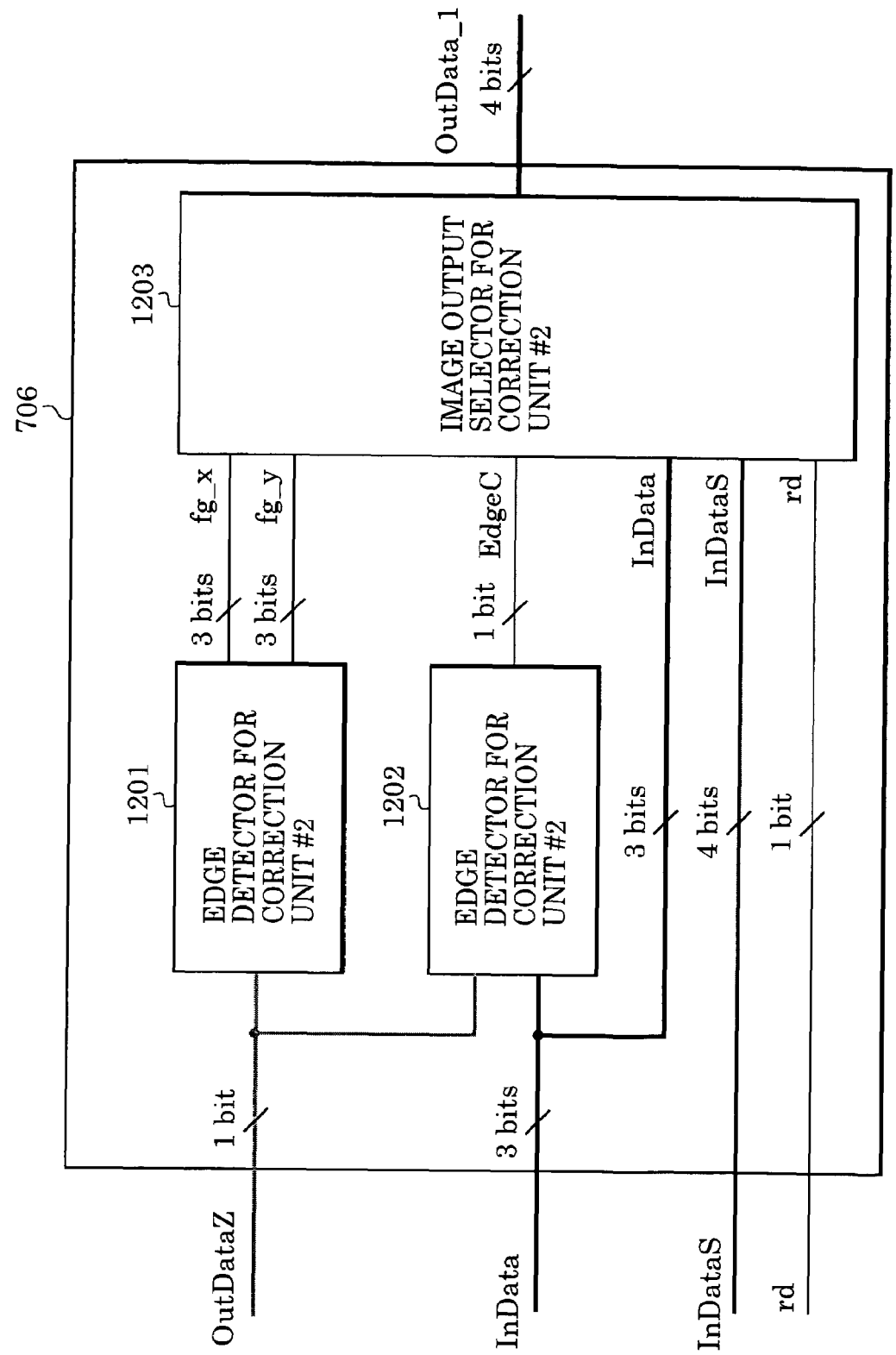
FIG. 13 is a block diagram showing an exemplary detailed structure of an image signal correction unit shown in FIG. 7.

FIG. 13 is a block diagram showing an exemplary detailed structure of the image signal correction unit 706 shown in FIG. 7, wherein similar parts to those in FIG. 7 are denoted by similar reference numerals.

As shown in FIG. 13, OutDataZ", "InData", "InDataS", and "rd" are input to the image signal correction unit 706, and a 4-bit signal "OUTData_1" is output as a correction signal. The input signals are similar to those described above with reference to FIG. 9.

As with the image signal correction unit 705 described above with reference to FIG. 9, the process performed by the image signal correction unit 706 is performed by three components namely an edge detection unit 1201 in the second correction, and an edge detection unit 1202 in the second correction, and an output image switching unit 1203 in the second correction.

FIG. 14 is a diagram showing an example of a program described in C language for implementing the edge detection unit 1201 in the second correction unit shown in FIG. 13, wherein similar parts to those in FIG. 13 are denoted by similar reference numerals.

In FIG. 14, the process performed by the edge detection unit 1201 in the second correction unit mainly includes two parts: a program 1302 and a program 1304.

In the program 1302, dots with a value other than 0 in the horizontal direction (x direction) are counted. In FIG. 14, an illustration 1303 shows an example of a manner in which dots are counted.

In the program 1304, dots with a value other than 0 in the vertical direction (y direction) are counted. An illustration 1305 shows an example of a manner in which dots are counted. In both counting processes, edges are detected on the basis of the 1-bit image-area signal. Note that edges in the horizontal or vertical direction are detected by counting dots without using a filtering process such as a Laplacian filtering process. Unlike the counting process performed by the edge detection unit 102 in the first correction unit, the counting process of the present embodiment divides an area of interest into right and left sub-areas or into upper and lower sub-areas, and counting is performed for respective sub-areas. The results are given by fg_x1, fg_x2 when the area is divided into right and left sub-areas, or by fg_y1 and fg_y2 when the area is divided into upper and lower sub-areas.

The results obtained via the program 1302 and the program 1304 described above are output as 3-bit count values fg_x and fg_y indicating the numbers of data with a value other than 0.

The edge detection unit 1202 in the second correction unit is now described below.

Figure 15:
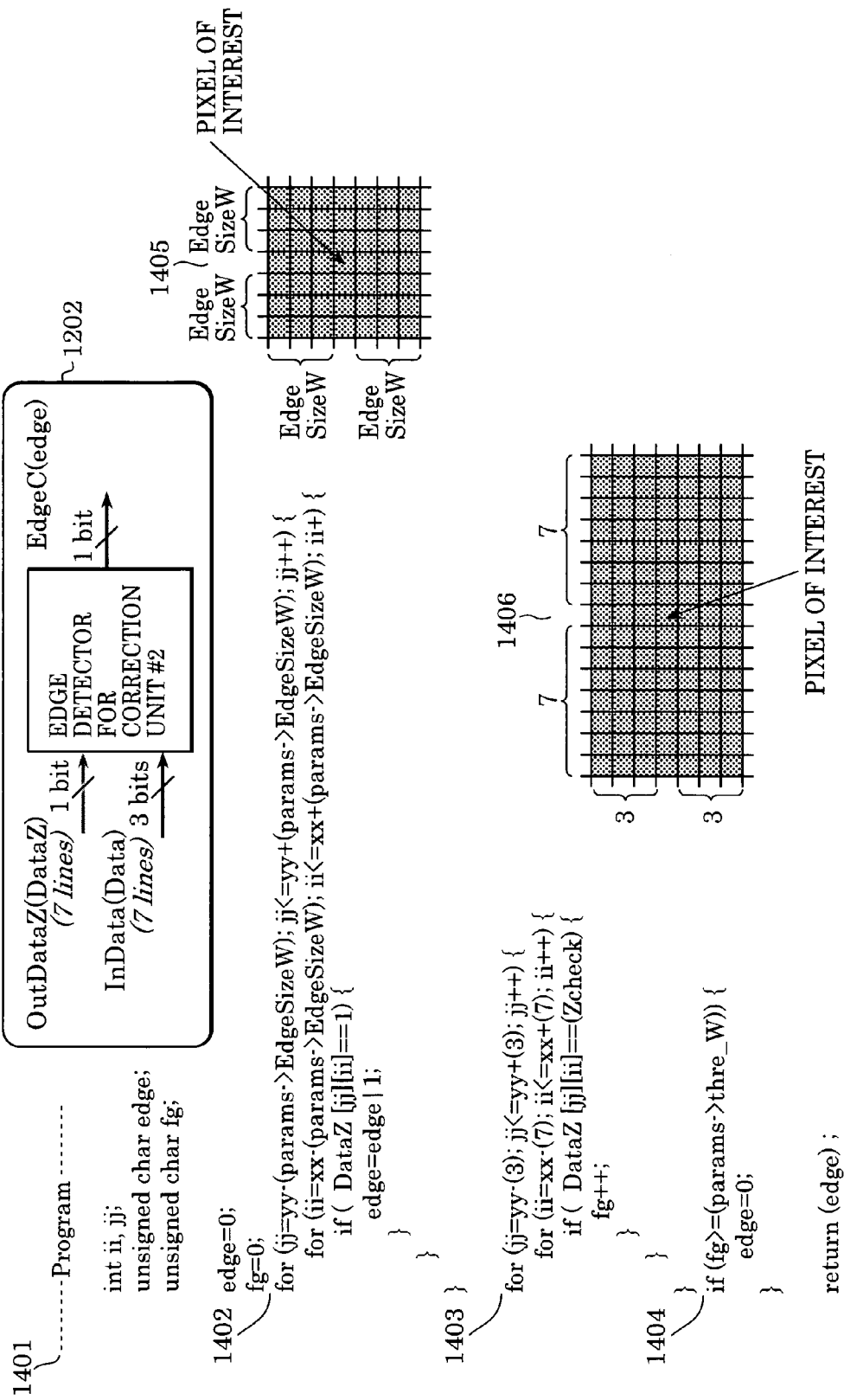
FIG. 15 is a diagram showing a program described in C language for implementing the edge detection unit in the second correction unit of FIG. 13.

FIG. 15 is a diagram showing an example of a program described in C language for implementing the edge detection unit 1202 in the second correction unit shown in FIG. 13, wherein similar parts to those in FIG. 13 are denoted by similar reference numerals. The process performed by the edge detection unit 1202 includes three parts, as described below.

First, in the program 1402, as in the detection process 1405, it is determined whether an area indicated by the parameter "EdgeSizeW" includes an image-area signal having a value of 1, and an edge signal indicating the result is output.

Then in the program 1403, as in the counting process 1406, counting is performed to detect the number of pixels with the same value as the parameter "Zcheck" in a 15×7 pixel area, and an fg signal indicating the result is output.

Finally, if the count value fg is equal to or greater than the parameter "thre_W", the edge signal is set to "0", but otherwise the edge signal is directly output.

An advantage of the present process is that edges are detected without using a filter such as a Laplacian filter and the edge information is cleared when the count value fg, indicating the number of pixels having the same value in an area of interest as the parameter "Zcheck", is equal to or greater than "thre_B".

Also in this process, note that similar advantages to those described earlier with reference to FIG. 11 are achieved.

By using the process described above, a 1-bit edge signal is generated and output as "EdgeC".

The output image switching unit 1203 used by the second correction unit is now described.

Figure 16:
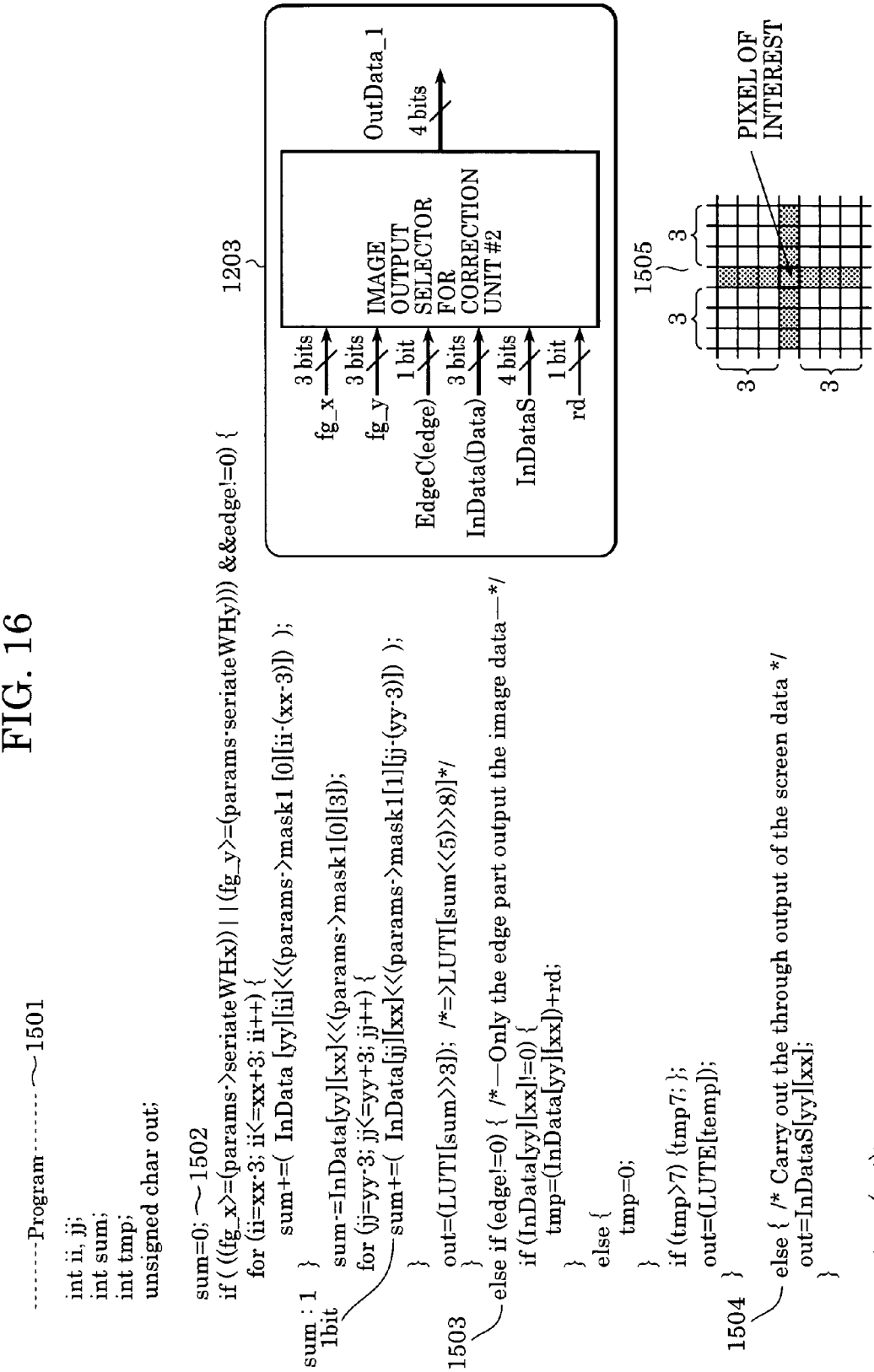
FIG. 16 is a diagram showing a program described in C language for implementing the output image switching unit in the second correction unit of FIG. 13.

FIG. 16 is a diagram showing an example of a program described in C language for implementing the output image switching unit 1203 in the second correction unit shown in FIG. 13, wherein similar parts to those in FIG. 13 are denoted by similar reference numerals. The output image switching unit 1203 is similar to the above-described output image switching unit 103 in the correction unit 1, and thus details thereof are not described herein.

In the output image switching unit 103 in the first correction unit, input signals fg_x, fg_y, and EdgeC are generated by counting the number of 0s in the image-area signal (DataZ). In contrast, in the output image switching unit 1203 shown in FIG. 16, input signals fg_x, fg_y, and EdgeC are generated by counting the number of is in the image-area signal (DataZ).

The data "OUTData_1" output from the image signal correction unit 705 and the data "OUTData_2" output from the image signal correction unit 706 are input to the selector 707 shown in FIG. 7, and a final 4-bit output signal "OutputData" is output from the selector 707. The selector 707 switches the output signal depending on the image-area signal (DataZ=OutDataZ) associated with a pixel of interest. When DataZ is equal to "1", the selector 707 selects the data output from the image signal correction unit 705, but the selection 707 selects the data output from the image signal selection unit 706 when DataZ is equal to "0".

The data obtained via the process described above is finally output as smoothed data to the printer 305. An example of an output image is shown in FIG. 17.

Figure 17:
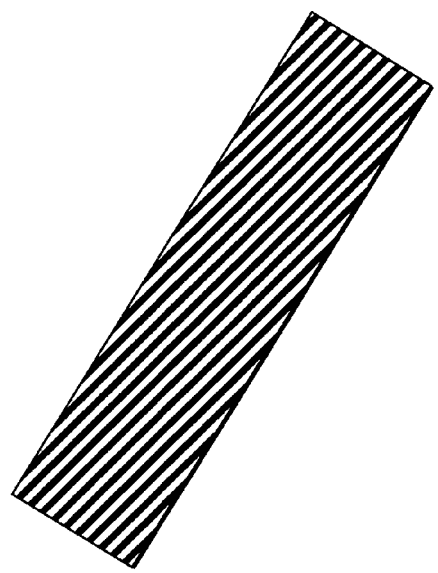
FIG. 17 is a diagram showing an example of a result of an edge correction process performed by an image processing system according to the present invention.

FIG. 17 is a diagram showing an image obtained as a result of the process performed by the image processing system according to an embodiment of the present invention.

Figure 23A:
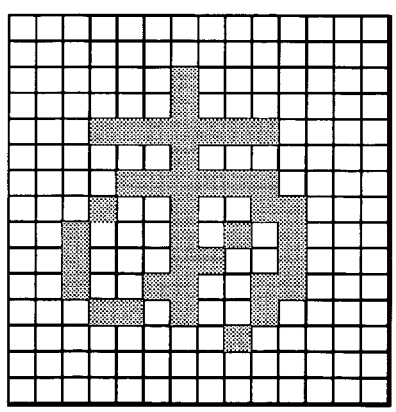
FIGS. 23A and 23B are schematic diagrams showing examples of characters processed by a conventional image processing system.
Figure 23B:
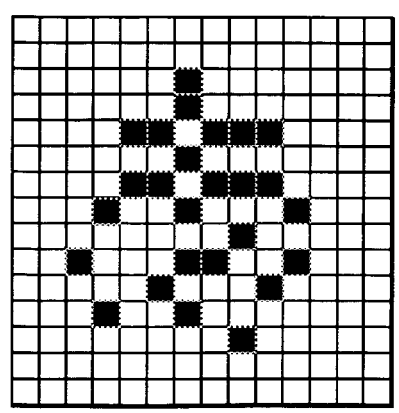
Figure 24:
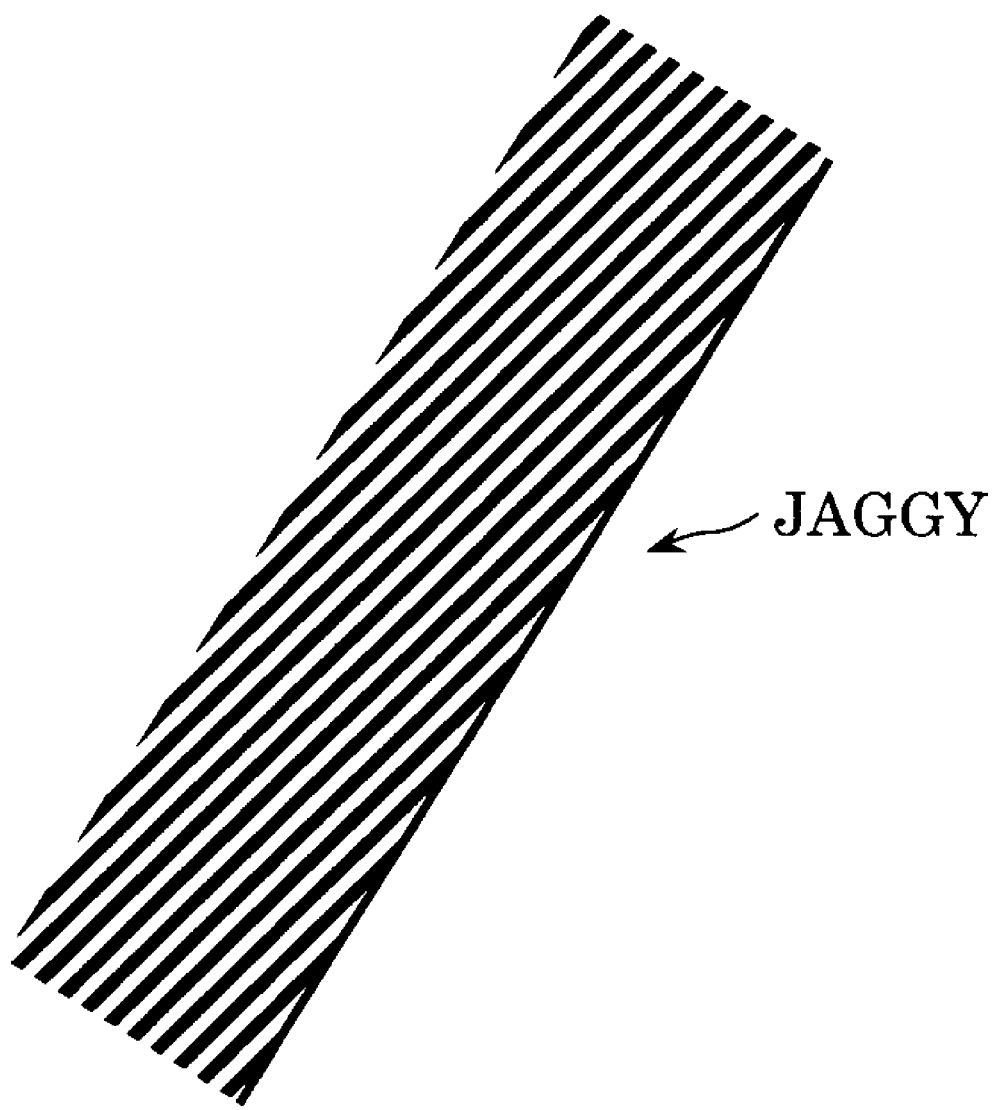
FIG. 24 is a schematic diagram showing an example of a character processed by a conventional image processing system.

Compared with the examples shown in FIGS. 23A and 23B, jaggies at edges are improved in the example shown in FIG. 17. As can be seen from FIG. 17, spaces between screen patterns are filled with low-level data.

Although not shown in the figure, jaggies at edges for images subjected to lossy compression (e.g. JPEG) can be improved as described earlier.

This is achieved because original image data is converted into 3-bit data and further into a 1-bit image-area signal serving as the edge detection control signal, and edges are detected on the basis of the 1-bit image-area signal thereby removing degradation caused by the compression.

As described above, in the present invention, detection of edges is achieved by separately processing detection image data and image data generated via the image forming process, using the novel method described above.

A further embodiment according to the present invention is described below. In this embodiment, similar parts to those in the above-described embodiment are denoted by similar reference numerals, and they are not described herein in further detail.

Figure 18:
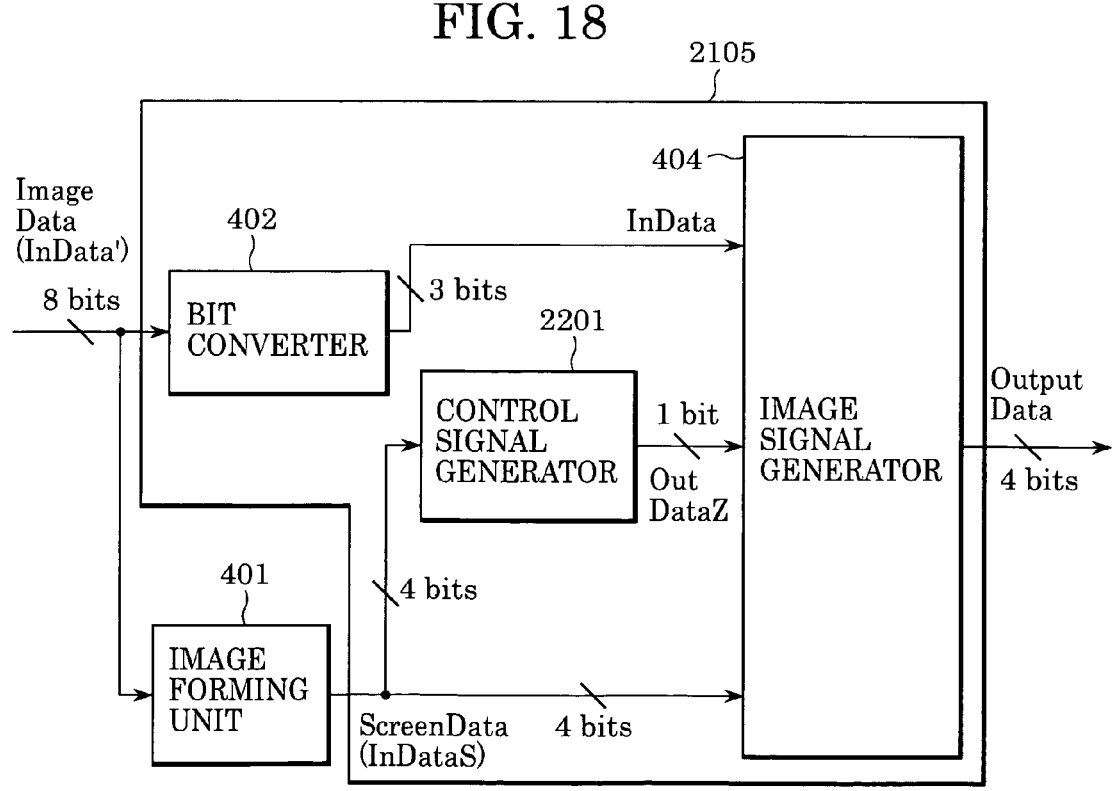
FIG. 18 is a block diagram showing an exemplary structure of the smoothing unit of FIG. 3.
Figure 21:
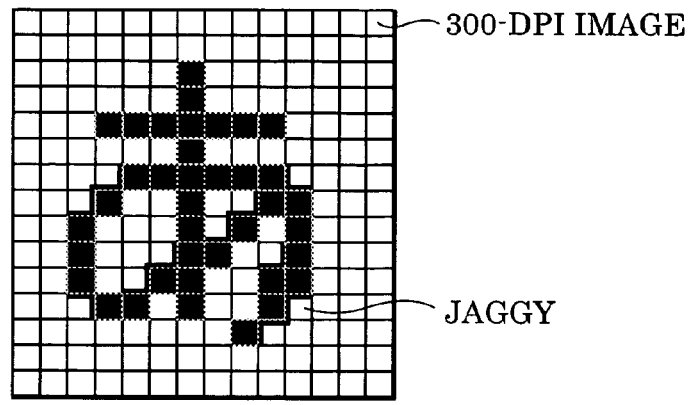
FIG. 21 is a schematic diagram showing an example of a character processed by a conventional image processing system.
Figure 22A:
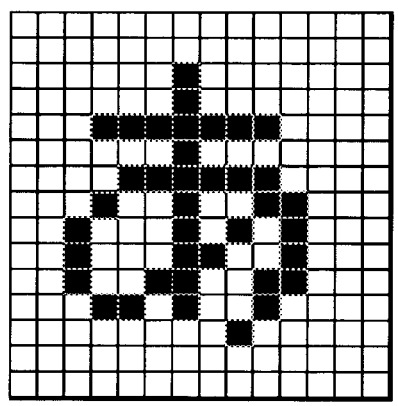
FIGS. 22A and 22B are schematic diagrams showing examples of characters processed by a conventional image processing system.
Figure 22B:
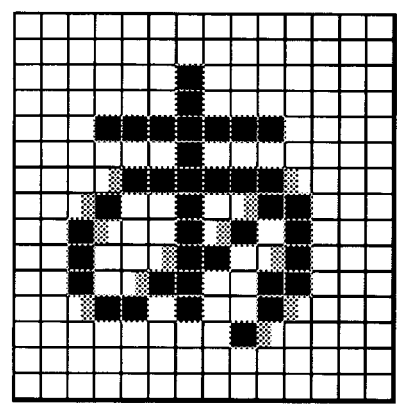

FIG. 18 is a block diagram of a smoothing unit of an image processing system according to an embodiment of the present invention, wherein similar parts to those in FIG. 4 are denoted by similar reference numerals.

The present embodiment shown in FIG. 18 is characterized by a signal ScreenData (InDataS) input to a control signal generator 2201. Note that this signal has already been subjected to the image forming process, and an image-area signal (DataZ) similar to that described above with reference to the embodiment is produced from the signal ScreenData.

FIG. 19 is a diagram showing an example of a program described in C language for implementing the control signal generator 2201 shown in FIG. 18.

In FIG. 19, a 4-bit value is set in a register reg_air. The input signal InDataS is compared with the value stored in this register. If the input signal InDataS is equal to or greater than the value stored in the register, the image-area signal OutDataZ (DataZ) is set to 1, but otherwise to 0.

In this embodiment, because the image-area signal OutDataZ is generated on the basis of the data already subjected to the image forming process, a good edge correction, in which the image forming process is well reflected, is achieved. That is, an advantage of the edge correction process according to the present embodiment is that it can be used to improve jaggies that can occur due to a printer resolution as described earlier with reference to conventional techniques, rather than when applied to trimming shown in FIG. 17. Unlike conventional systems, the edge correction process according to the present embodiment is also capable of compensating for image quality degradation due to lossy compression.

Thus, the present embodiment can be applied to a low-resolution printer such as a printer used in a facsimile machine using a lossy compression process.

As described above, the present invention improves not only jaggies due to a low printer resolution but also jaggies due to image forming process such as screen processing using, for example, 175 or 133 lines. Jaggies on a screen occurs at a resolution much lower than the printer resolution, and are noticeable in halftone characters or lines. Such jaggies can be improved significantly by the present invention.

Furthermore, the present invention is applicable not only to an image subjected to the screen processing or similar image forming process, but also applicable to an image subjected to image forming process based on error diffusion. Halftone characters or lines subjected to error diffusion have irregularities at edges in forms different from jaggies described above.

Furthermore, the present invention can also reduce mosquito noise appearing at edges due to lossy compression. That is, the present invention can improve degradation at edges due to compression.

Although not discussed, further advantages of the present invention can also be found. For example, the present invention can improve jaggies in an image output from a scanner and a PDL image output from a PC.

Referring to a memory map shown in FIG. 20, a data processing program readable by a system according to the present invention is described below.

FIG. 20 is a diagram showing a memory map of a storage medium that stores various data processing programs readable by the system according to the present invention.

Note that in addition to information shown in FIG. 9, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The program for implementing the functions described above with reference to specific examples of programs (shown in FIGS. 5 to 8, 10 to 12, 14 to 16, and 19) described in the C language according to the present invention may be installed from the outside on a host computer, and the program may be executed on the host computer. In this case, information including the program according to the present invention may be supplied to an output system from a storage medium such as a CD-ROM, a flush memory, or a FD, or from an external storage medium via a network.

The objects of the present invention may also be achieved by providing to a system or an system a storage medium having software program code stored thereon for implementing the functions disclosed in the embodiments described above and by reading and executing the program code on a computer (or a CPU or an MPU) disposed in the system or the system.

In this case, the program code read from the storage medium implements the novel functions disclosed in the embodiments described above, and the storage medium on which the program code is stored falls within the scope of the present invention.

Note that there is no particular restriction on the type of program, as long as the program can implement the functions according to the present invention. For example, the program may be in an object code, an interpreter, or script data supplied to an OS.

Storage media, which can be preferably employed in the present invention to supply the program, include a floppy disk, a hard disk, an optical disk, a magneto-optical disk, an MO, a CD-ROM, a CD-R, a CD-RW, a magnetic tape, a non-volatile memory card, a ROM, and a DVD.

In this case, the program code read from the storage medium implements the functions disclosed in the embodiments described above, and the storage medium on which the program code is stored falls within the scope of the present invention.

The program may also be supplied such that a client computer is connected to an Internet Web site via a browser, and an original computer program according to the present invention or a file including a compressed computer program and an automatic installer is downloaded into a storage medium such as a hard disk of the client computer. The program code of the program according to the present invention may be divided into a plurality of files, and respective files may be downloaded from different Web sites. Thus, a WWW server, an ftp server and similar servers that provide a program or a file that allows the functions according to the present invention to be implemented on a computer also fall within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer thereby achieving the functions according to the present invention.

The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system comprising:
   an input unit for inputting N-bit image data;
   a pseudo halftone representation unit for converting the N-bit image data into M-bit image data;
   a first bit conversion unit for converting the N-bit image data into L-bit image data;
   a control signal generation unit for generating a control signal from the L-bit image data;
   a first edge detection unit for detecting a first edge from the control signal generated by the control signal generation unit;
   a second edge detection unit for detecting a second edge from the control signal generated by the control signal generation unit;
   a second bit conversion unit for converting the L-bit image data into M-bit image data;
   a smoothing unit for smoothing the L-bit image data and generating M-bit image data; and
   an output image data switching unit for switching output image data between the image data output by the smoothing unit, the image data output by the second bit conversion unit, and the image data output by the pseudo halftone representation unit, wherein the output image data depends on the first and second edges detected by the first and second edge detection units.

2. An image processing system according to claim 1, wherein the output image data switching unit switches the output image data such that (i) for a pixel included in the first edge but not in the second edge, the image data output by the smoothing unit is selected, (ii) for a pixel included in an edge for which the image data output by the smoothing unit is not selected, but not included in the second edge, the image data output by the second bit conversion unit is selected, and (iii) for the other pixels, the image data output by the pseudo halftone representation unit is selected.

3. An image processing system according to claim 2, wherein the pseudo halftone representation unit performs dithering or error diffusion.

4. An image processing system according to claim 2, wherein the first bit conversion unit performs bit shifting.

5. An image processing system according to claim 2, wherein the second bit conversion unit performs a table conversion using a memory.

6. The system of claim 1 wherein N>M and N>L.

7. The system of claim 6 wherein N=8, M=4 and L=3.

8. An image processing system comprising:
   an input unit for inputting N-bit image data;
   a pseudo halftone representation unit for converting the N-bit image data into M-bit image data;
   a first bit conversion unit for converting the N-bit image data into L-bit image data;

a control signal generation unit for generating a control signal from the M-bit image data;

a first edge detection unit for detecting a first edge from the control signal generated by the control signal generation unit;

a second edge detection unit for detecting a second edge from the control signal generated by the control signal generation unit;

a second bit conversion unit for converting the L-bit image data into M-bit image data;

a smoothing unit for smoothing the L-bit image data and generating M-bit image data; and an output image data switching unit for switching output image data among the image data output by the smoothing unit, the image data output by the second bit conversion unit, and the image data output by the pseudo halftone representation unit, depending on the first and second edges detected by the first and second edge detection units.

9. An image processing system according to claim 8, wherein the output image data switching unit switches the output image data such that (i) for a pixel included in the first edge but not in the second edge, the image data output by the smoothing unit is selected, (ii) for a pixel included in an edge for which the image data output by the smoothing unit is not selected, but not included in the second edge, the image data output by the second bit conversion unit is selected, and (iii) for the other pixels, the image data output by the pseudo halftone representation unit is selected.

10. An image processing system according to claim 9, wherein the pseudo halftone representation unit performs dithering or error diffusion.

11. An image processing system according to claim 9, wherein the first bit conversion unit performs bit shifting.

12. An image processing system according to claim 9, wherein the second bit conversion unit performs a table conversion using a memory.

13. The system of claim 8 wherein N>M and N>L.

14. The system of claim 13 wherein N=8, M=4 and L=3.

15. An image processing method comprising:

an input step of inputting N-bit multilevel image data;

a pseudo halftone representation step of converting the N-bit image data into M-bit image data;

a first bit conversion step of for converting the N-bit image data into L-bit image data;

a control signal generation step of generating a control signal from the L-bit image data;

a first edge detection step of detecting a first edge from the control signal generated in the control signal generation step;

a second edge detection step of detecting a second edge different from the first edge from the control signal generated in the control signal generation step;

a second bit conversion step of converting the L-bit image data into M-bit image data;

a smoothing step of smoothing the L-bit image data and generating M-bit image data as a result of the smoothing; and an output image data switching step of switching output image data among the image data output in the smoothing step, the image data output in the second bit conversion step, and the image data output in the pseudo halftone representation step, depending on the first and second edges detected in the first and second edge detection steps.

16. An image processing method according to claim 15, wherein in the output image data switching step, the output image data is switched such that (i) for a pixel included in the first edge but not in the second edge, the image data output in the smoothing step is selected, (ii) for a pixel included in an edge for which the image data output by the smoothing unit is not selected, but not included in the second edge, the image data output in the second bit conversion step is selected, and (iii) for the other pixels, the image data output in the pseudo halftone representation step is selected.

17. An image processing method according to claim 16, wherein the pseudo halftone representation step includes dithering or error diffusion.

18. An image processing method according to claim 16, wherein the first bit conversion step includes bit shifting.

19. An image processing method according to claim 16, wherein the second bit conversion step includes a table conversion process using a memory.

20. An image processing method comprising:

an input step of inputting N-bit multilevel image data;

a pseudo halftone representation step of converting the N-bit image data into M-bit image data;

a first bit conversion step of for converting the N-bit image data into L-bit image data;

a control signal generation step of generating a control signal from the M-bit image data;

a first edge detection step of detecting a first edge from the control signal generated in the control signal generation step;

a second edge detection step of detecting a second edge from the control signal generated in the control signal generation step;

a second bit conversion step of converting the L-bit image data into M-bit image data;

a smoothing step of smoothing the L-bit image data and generating M-bit image data as a result of the smoothing; and an output image data switching step of switching output image data among the image data output in the smoothing step, the image data output in the second bit conversion step, and the image data output in the pseudo halftone representation step, depending on the first and second edges detected in the first and second edge detection steps.

21. An image processing method according to claim 20, wherein in the output image data switching step, the output image data is switched such that (i) for a pixel included in the first edge but not in the second edge, the image data output by the smoothing unit is selected, (ii) for a pixel included in an edge for which the image data output by the smoothing unit is not selected but not included in the second edge, the image data output in the second bit conversion step is selected, and (iii) for the other pixels, the image data output in the pseudo halftone representation step is selected.

22. An image processing method according to claim 21, wherein the pseudo halftone representation step includes dithering or error diffusion.

23. An image processing method according to claim 21, wherein the first bit conversion step includes bit shifting.

24. An image processing method according to claim 21, wherein the second bit conversion step includes a table conversion process using a memory.

* * * * *